United States Patent [19]
Inoue

[11] Patent Number: 6,034,928
[45] Date of Patent: Mar. 7, 2000

[54] LIBRARY APPARATUS

[75] Inventor: Kazuhiko Inoue, Kawasaki, Japan

[73] Assignee: Fujitsu Limited, Kawasaki, Japan

[21] Appl. No.: 09/290,187

[22] Filed: Apr. 13, 1999

Related U.S. Application Data

[62] Division of application No. 08/958,912, Oct. 28, 1997, Pat. No. 5,940,354.

[30] Foreign Application Priority Data

Mar. 17, 1997 [JP] Japan .................................... 9-062760

[51] Int. Cl.⁷ ............................. G11B 17/22; G11B 15/68
[52] U.S. Cl. ................................. 369/36; 369/35; 360/92
[58] Field of Search ............................... 369/34, 35, 36, 369/38, 178, 191; 360/92

[56] References Cited

U.S. PATENT DOCUMENTS

| | | | |
|---|---|---|---|
| 5,337,297 | 8/1994 | Kvifte et al. | 369/36 |
| 5,371,640 | 12/1994 | Kvifte et al. | 360/92 |
| 5,761,161 | 6/1998 | Gallo et al. | 369/36 |
| 5,781,367 | 7/1998 | Searle et al. | 360/92 |

FOREIGN PATENT DOCUMENTS

| | | |
|---|---|---|
| 0 427 531 | 5/1991 | European Pat. Off. . |
| 1-151056A | 9/1989 | Japan . |
| 5-325361A | 12/1993 | Japan . |
| 5-334788 | 12/1993 | Japan . |
| 9-050665 | 2/1997 | Japan . |

Primary Examiner—William Klimowicz
Attorney, Agent, or Firm—Staas & Halsey LLP

[57] ABSTRACT

In a library apparatus, plural recording media are received in respective, assigned slots in a tray movable between a closed position within a housing and, selectively, in a first mode to a fully opened position affording access to all of the slots and respective, assigned recording media therein and, in a second mode, to a mail slot access position affording access to a mail slot into which an individual recording medium is selectively inserted or removed. In an insertion operation of the second mode and with a recording medium present in the mail slot in the closed position of the tray, an accessor conveys the recording medium from the mail slot, designated as a source location, to a respective slot of the tray assigned to the recording medium and designated as a destination location thereof and, in an ejection operation of the mail slot mode, conveys the recording medium from the assigned slot of the tray designated as a source location to the mail slot, designated as a destination location. The controller, further, controls the accessor to convey a selected recording medium from the respective assigned slot in the tray to a driving unit for recording and reproducing operations on the specific recording medium and, thereafter, to return the specific recording medium to the assigned slot.

13 Claims, 17 Drawing Sheets

| SLOT NUMBER | MEDIUM FLAG | STATUS |
|---|---|---|
| #01 | ON | |
| #02 | ON | |
| #03 | ON | |
| #04 | ON | |
| #05 | ON | |
| #06 | ON | |
| #07 | ON | |
| #08 | ON | |
| #09 | ON | |
| #10 | ON | D1 |
| #11 | ON | D2 |
| #12 | ON | |
| #13 | OFF | |
| #14 | OFF | |
| #15 | ON | |
| #16 | ON | |
| #29 | ON | |
| #30 | ON | |
| #31 | ON | |
| #32 | ON | |
| #33 | ON | |
| #34 | ON | |
| #35 | ON | MAIL |

50

LIBRARY APPARATUS

This application is a divisional application of application Ser. No. 08/958,912, filed Oct. 28, 1997, now U.S. Pat. No. 5,940,354.

BACKGROUND OF THE INVENTION

1. Field of the Invention

The present invention relates to a library apparatus having a housing into which a tray, having plural storage slots storing respective, plural cartridge media, is movable to a closed position at which an accessor selectively moves an individual cartridge medium between the tray and a drive mechanism in accordance with a move command issued from a host computer. More particularly, the invention relates to such a library apparatus having a mail slot mode in which the tray is opened selectively to a mail slot access position for manual insertion of a single cartridge medium into the mail slot or manual removal thereof from the mail slot, in respective insertion and removal operations in which the medium is conveyed between the mail slot and a respective storage slot, controlled by corresponding move commands from the host computer and whereby the potential of human error in cartridge media exchange operations is eliminated.

2. Description of the Related Art

In recent years, due to the increased use of graphics and large software programs and the large amounts of data required therefor, optical disks have become a popular storage medium for computers, in view of their large memory capacities, exceeding 200 MB; further, they may be provided as removable cartridges that can be used with different optical disk drives. Their popularity has further increased with the recent development of 3.5-inch optical disk drives having cost and access speeds comparable to those of hard disk drives of just a few years ago. (Hereinafter, the terms "optical disk", "OM cartridges", "cartridge medium" or "media", etc., are used interchangeably.)

A single optical disk cartridge nevertheless has a finite memory capacity which may be inadequate for graphics and other large software programs; thus, desk-top type optical disk library apparatuses have become available which accommodate therein a plurality of optical disk cartridges which are individually selected by a robot hand and loaded thereby into an optical disk drive. An example thereof is a 3.5-inch magneto-optic (MO) disk library apparatus M2532B made by Fujitsu Ltd. In this desk-top type optical disk library apparatus, three racks can be mounted in a tray of the apparatus; an individual such rack has twelve (12) slots which can receive twelve (12) corresponding MO cartridges. Consequently, a total of thirty-six (36) MO cartridges can be received in the tray.

Usually, the MO cartridges are inserted into, or ejected from, the library apparatus on a rack-by-rack basis. Then, when an ejection switch, provided on a control panel of the apparatus, is depressed, the tray is pulled out from its fully inserted, or loaded, position within the housing of the apparatus so as to extend from the front face of the apparatus in a fully opened state, or position. Each rack is detached from the tray, in the fully opened state of the tray, MO cartridges are ejected from and/or are inserted into the respective slots of the rack, and the rack then is returned to the tray. When the ejection switch is depressed, again, the tray is retracted, or advanced into its fully loaded position within the housing thereby completing the preparation for reading or writing operations relative to the newly provided, i.e., exchanged, MO cartridge media.

In one illustrative activity using such a library apparatus, there is a requirement for exchanging the cartridge media stored in the library apparatus, one by one, and processing the data. For example, when data of a number of branches of a company distributed all over Japan is processed in a main office of the company by using respective MO cartridges from those branches, on a monthly basis, the MO cartridge of a given branch for a current month is exchanged for a medium cartridge of the same branch for the previous month which is currently stored in the library apparatus.

As for the activity of exchanging each such MO cartridge, the tray is fully opened by operating the ejection switch and, since a respective, fixed slot number has been established for every branch, the operator checks the respective slot number for the branch name of the MO cartridge to be exchanged, finds the respective slot by counting the slots in the racks in the tray (or observing a location number for the slot), and then exchanges the new for the prior, MO cartridge.

The work of exchanging the MO cartridge, which is executed by finding the slot position of the cartridge to be exchanged by counting the slot numbers of the racks in the tray, presents problems such as imposing a large work burden on the operator and causing mistakes in the work such that an exchange of an MO cartridge at a wrong slot is apt to occur. Usually, not merely a single library apparatus but, rather, several library apparatuses are connected to the host computer. The number of MO cartridges to be exchanged accordingly increases and, consequently, further increases the work burden and the frequency of the occurrences of mistakes in making such exchanges. The present invention arose in consideration of solving the above problems of the prior art.

SUMMARY OF THE INVENTION

Thus, it is an object of the present invention to overcome the above and other problems of prior art such library apparatus.

More particularly, it is an object of the present invention to provide a library apparatus affording the functions of inserting and/or ejecting cartridge media by opening or closing a tray, and in which tray cartridge media can be easily inserted or ejected, on a one-by-one basis, and wherein a mistake in an operation of exchanging a new cartridge media for a currently stored cartridge media can be certainly prevented.

Another object of the present invention is to provide such a library apparatus which is operable both in a normal mode in which the tray is withdrawn from a housing to a fully opened position for inserting or exchanging cartridge media and then inserted into the housing of the apparatus and also, alternatively and selectively, in a mail slot mode in which the tray is opened to a mail slot access position permitting insertion, or withdrawal, of an individual cartridge medium from a mail slot of the tray.

Yet another object of the present invention is to provide a library apparatus operable in accordance with commands from a host computer, each command designating source and destination locations between which a specified cartridge medium is to be moved and wherein each of the plural storage slots and a mail slot of the tray and a drive unit for operating on an individual, selected cartridge medium may be selectively designated as one of source location and a destination location in each of plural, different move commands for performing cartridge media insertion, ejection, and read operations.

More particularly, a library apparatus in accordance with the present invention has a housing and a tray which is movable along a first direction into and out of the housing and which has one or more racks detachably mounted thereon, each rack having plural slots receiving respective cartridge media and which are selectively conveyed by an accessor between source and destination slots and, more particularly, to such an apparatus selectively operable in normal and mail slot modes of operation. In the normal mode, the tray is withdrawn from the housing to a fully opened position providing access to the racks for manual insertion and/or manual withdrawal of cartridge media, into or from the respective slots, either individually or in bulk, e.g., on a rack-by-rack basis. In the mail slot mode, the tray is withdrawn from the housing by only a limited extent to a mail slot access position, at which a predesignated mail slot is accessible for manual insertion of an individual cartridge therein or manual withdrawal of an individual cartridge therefrom, respectively in cartridge insertion and cartridge ejection operations. In the insertion operation of the mail slot, the tray with the cartridge inserted in the mail slot is moved to the closed portion and the cartridge media is conveyed automatically by the accessor, in accordance with a moving command, from the mail slot, as a source, to a different, destination slot. Correspondingly, in the ejection operation of the mail slot mode, a cartridge in a respective storage slot of the tray is conveyed by the accessor therefrom, as a source, to the mail slot, as a destination, and the tray then is opened to the mail slot access position.

More particularly, the library apparatus of the invention comprises a housing in which a tray is received, and movable through, a front portion of the housing along a first direction corresponding to the depth, or length, of the elongated tray. Plural racks are received in the tray, stacked in the first direction and each defining plural slots therein, extending in a second direction perpendicular to the first direction, the plural slots accommodating plural, respective cartridge media, such as optical disk cartridges, which are inserted thereinto in the second, lateral direction, multiple such cartridge media thus being stacked in the first, depth direction of the tray.

In the normal mode of operation, the tray is withdrawn from the housing to a fully opened position in which the racks are removable from the tray and all of the slots of each of the racks are accessible for insertion thereinto or withdrawal therefrom of respective cartridge media. On the other hand, in the mail slot mode, the tray is withdrawn from the housing to only a partially opened position (i.e., a mail slot access position), sufficient to expose a preselected or predetermined mail slot, such as a first or front-most slot in the first rack in the tray; in the mail slot access position of the tray and thus in the mail slot mode, typically only the preselected, single mail slot is accessible and only a single cartridge medium may be manually inserted into or withdrawn from the (single) accessible mail slot.

Operating components and controls of the library apparatus of the invention comprise, illustratively, a micro processor unit ("MPU") defining therewithin a mode setting unit, a medium insertion processing unit, a medium ejection processing unit and a read/write medium conveyance unit, each thereof interconnected with a host interface and a device interface, the former providing an interconnection to a host computer and the latter providing interconnections to various components of the apparatus. More particularly, an accessor, provided in the housing, is operative for conveying the media selectively between respective slots assigned thereto in corresponding racks of the tray, and constituting source locations, and the drive units, likewise disposed within the housing and constituting destination locations.

Within the MPU, a mode setting unit selectively sets the apparatus in either the normal mode or the mail slot mode. The medium insertion processing unit, when in the mail slot mode of the apparatus, opens the tray to the mail slot access position at which the mail slot is accessible for insertion of an optical medium thereinto and then, after the medium is inserted therein, closes the tray. In the closed position of the tray, the medium then is conveyed by the accessor, under control of the read/write medium conveyance unit, from the mail slot to an insertion destination slot assigned to that cartridge medium, for storage therein. Likewise in the mail slot mode but in an ejecting operation, the accessor conveys the medium to be ejected from the assigned slot, as a source location, to the mail slot, as a destination location, and the medium ejection processing unit then opens the tray to the mail slot access position for removal of the cartridge media from the mail slot.

In the library apparatus of the invention, when an individual medium is inserted into or ejected from an arbitrary slot in the tray, respectively in an insertion or ejection operating state of the mail slot mode, it is sufficient for the operator to insert or eject the medium to/from the mail slot in the tray, when opened to the mail slot access position, and without the operator being aware of the slot in the tray assigned to that medium.

When the mail slot mode is set, the mode setting unit defines a specific slot in the tray as the mail slot and sets a movement amount of the tray, for moving the tray to the mail slot access position. The mode setting unit more particularly defines a slot position, typically in the front-most portion of the tray as the mail slot as discussed above, so that the medium can be easily, manually inserted into or withdrawn from the slot. The medium insertion processing unit opens or closes the tray to permit the medium insertion operation, on the basis of a moving command from the host computer, in which command the movement source is set to the mail slot (i.e., the mail slot is defined as the source of the medium to be moved in accordance with the moving command). That is, the mail slot is set as the movement source in the moving command as received from the host computer, whether or not a medium is detected to be present in the mail slot of the tray.

When no medium is present in the mail slot, the tray is opened to the mail slot access position and a medium is then inserted into the mail slot. Subsequently, when the operation of an ejection switch for opening or closing the tray is detected, the tray is moved to the closed position and the medium is conveyed by the accessor from the mail slot, set as the source location, to the assigned slot, set as the destination location. When the medium is present in the mail slot, the medium is immediately conveyed by the accessor from the mail slot to the assigned slot in the tray. In this case, after the tray is opened to the mail slot access position on the basis of the moving command, the medium insertion processing unit monitors the operation of the ejection switch. In the case where the operation of the ejection switch is not detected, even after a predetermined time has elapsed, the medium insertion processing unit reports an error to the host computer and, after that, closes the tray, the apparatus thereby returning to an initial state.

The medium insertion processing unit also can open or close the tray for medium insertion, only, by operating the ejection switch. That is, the medium insertion processing unit opens the tray to the mail slot access position upon detecting the operation of the ejection switch, either for opening or closing the tray; it subsequently closes the tray when the on-operation of the ejection switch is detected, and allows the medium to be conveyed by the accessor from the mail slot to the assigned slot, set as the insertion destination, on the basis of a subsequent moving command from the host computer and in which moving command the movement source is set to the mail slot.

In this case as well, the medium insertion processing unit monitors the operation of the ejection switch after the tray has been opened to the mail slot access position and, on the basis of the operation of the ejection switch and when the operation of the ejection switch is not detected even after a predetermined time has elapsed, an error is reported to the host computer and, after that, the tray is closed, thereby returning to the initial state.

Further, the medium insertion processing unit opens or closes the tray for a medium insertion operation by a tray opening command or a tray closing command, respectively, from the host computer. That is, the medium insertion processing unit opens the tray to the mail slot access position when the tray opening command from the host computer is received, subsequently closes the tray when the tray closing command from the host computer is received, and allows the medium to be conveyed by the accessor from the mail slot to the insertion destination slot on the basis of a subsequent moving command from the host computer in which the movement source is set to the mail slot.

In this case, as well, the medium insertion processing unit opens the tray to the mail slot access position on the basis of the tray opening command and, after that, monitors the receipt of the tray closing command. When the tray closing command is not received even after the predetermined time has elapsed, the medium insertion processing unit reports an error to the host computer and, after that, closes the tray, thereby returning to the initial state.

On the other hand, when a moving command, in which the movement destination is set to the mail slot, is received from the host computer, the medium ejection processing unit controls the accessor to convey the medium from the movement source slot to the mail slot as a destination slot and, after that, opens the tray to the mail slot access position. In this case, the medium ejection processing unit opens the tray to the mail slot access position on the basis of the moving command and, after that, monitors the on-operation of the ejection switch. When the on-operation of the ejection switch is not detected even after the predetermined time has elapsed, the medium ejection processing unit reports an error to the host computer and, after that, closes the tray, thereby returning to the initial state.

BRIEF DESCRIPTION OF DRAWINGS

The foregoing and other objects and features of the invention will be more fully appreciated from the following detailed description of the drawings herein, in which:

FIG. 13 illustrates a medium management table used by the library apparatus of the invention, such as shown in FIG. 11;

DETAILED DESCRIPTION OF THE PREFERRED EMBODIMENTS

Figure 1A:
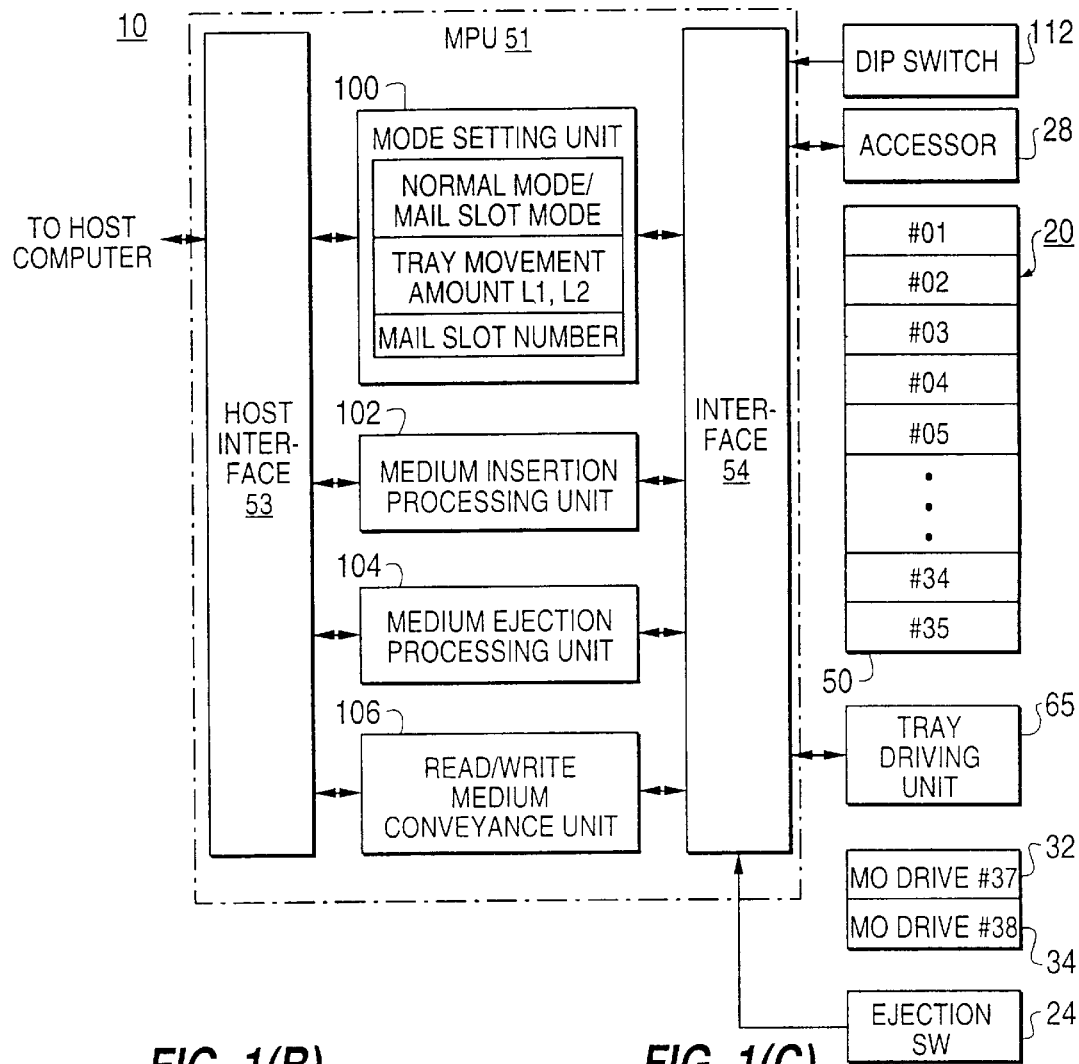
FIG. 1A is a block diagram of a library apparatus according to the invention.
Figure 1B:
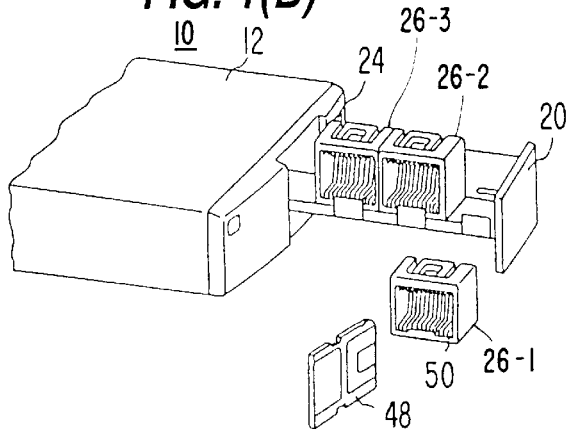
FIGS. 1B and 1C are fragmentary perspective views of a library apparatus according to the invention, showing normal and mail slot modes, respectively, of operation of the apparatus.
Figure 1C:
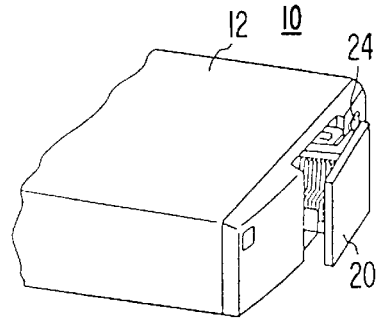

FIG. 1A is a block diagram used herein for explaining the principle of operation of the library apparatus of the invention and FIGS. 1B and 1C are partially broken-away views of the apparatus 10 respectively in first ("normal") and second ("mail slot") modes of operation thereof. As shown in FIG. 1B, The library apparatus 10 of the invention comprises a housing 10 in which a tray 20 is received in, and movable through, a front portion of the housing 10 in a first direction corresponding to the depth, or length, of the elongated tray 20. Plural racks 26 are received in the tray 20, stacked in the first direction and each defining plural slots therein, extending in a second direction perpendicular to the first direction, the plural slots accommodating plural, respective cartridge media, such as optical disk cartridges, inserted thereinto in the second, lateral direction, multiple such cartridge media thus being stacked in the first, depth direction of the tray 20. In the illustrative embodiment, three (3) racks 26-1 and 26-2 and 26-3 are accommodated in the tray 20.

FIG. 1B shows a "normal mode" of operation in which the tray 20 is withdrawn from the housing 12 to a fully opened position, in which the racks 26 are removable from the tray 20 and all of the slots of each of the racks 26 are accessible for insertion or withdrawal of cartridge media thereinto or therefrom. FIG. 1C, on the other hand, illustrates operation of the apparatus 12 in a "mail slot mode" in which the tray 20 is withdrawn from the housing to only a partially opened position sufficient to expose and afford access to a preliminarily defined or predetermined mail slot 50, e.g., a first or front-most slot in the first rack 26-1; in the mail slot access position of the tray 20 in the mail slot mode, typically only a selected, single mail slot 50 is accessible and only a single cartridge medium may be manually inserted into or withdrawn from the (single) accessible mail slot 50.

FIG. 1A is a block diagram illustrating operating components and controls of the library apparatus 10 of the invention, comprising illustratively a micro processor unit ("MPU") 50 defining therewithin a mode setting unit 100, a medium insertion processing unit 102, a medium ejection processing unit 104 and a read/write medium conveyance unit 106, each thereof connected to a host interface 53 and to a device interface 54, the former providing an interconnection to a host computer (not shown) and the latter providing interconnections to various components of the apparatus 10, as schematically shown in FIG. 1A. More particularly, an accessor 28, provided in the housing 12, is operative for conveying the media selectively between respective slots assigned thereto in corresponding racks 26 of the tray 20 and the drive units 32 and 34 disposed within the housing 12.

Within the MPU 51, the mode setting unit 100 selectively sets the apparatus 10 in either the normal mode of FIG. 1B or the mail slot mode of FIG. 1C. The medium insertion processing unit 102, in the mail slot mode of the apparatus 10, opens the tray 20 to the mail slot access position at which the mail slot 50 is accessible for manual insertion of an optical medium thereinto, and then, after the medium is inserted into and received in the mail slot, closes the tray 20. In the closed position of the tray 20, the medium then is conveyed by the accessor 28, under control of the read/write medium conveyance unit 106, from the mail slot to an insertion destination slot assigned to that medium, for storage therein. Likewise in the mail slot mode but to perform the function of ejecting the medium from the assigned slot thereof, the accessor 28 conveys the medium to be ejected from the assigned slot, as a source location, to the mail slot 50, as a destination location, and the medium ejection processing unit 104 then opens the tray 20 to the mail slot access position thereof for manual removal of the ejected medium.

In the library apparatus of the invention, when an individual medium is inserted into or ejected from an arbitrary slot in the tray in an insertion or ejection operating state, respectively, of the mail slot mode, it is sufficient for the operator to insert or eject the medium to/from the mail slot 50 in the mail slot access position of the tray without the operator being aware of what slot in the tray is assigned to that medium. For example, the operator may determine and select the proper cartridge medium to be inserted in the mail slot either on the basis of an instruction displayed by the host computer on a display screen or, in the case of a media exchange operation as in the central bank application of the invention discussed above, by reference to a cartridge medium currently being ejected.

In the mail slot mode, the mode setting unit 100 defines a specific slot in the tray 20 as a mail slot 50 and sets a movement amount of the tray 20 corresponding to the mail slot access position of the tray. The mode setting unit 100 more particularly defines a slot position in the front-most portion of the tray 20 as the mail slot 50, as seen in FIG. 1C and as discussed above, so that the medium can be easily, manually inserted into or withdrawn from the slot 50. The medium insertion processing unit 102 opens or closes the tray 20, to permit the medium insertion operation, on the basis of a moving command from the host computer, in which command the movement source is set to the mail slot 50 (i.e., the mail slot 50 is defined as the source of the medium to be moved in accordance with the moving command). That is, the mail slot 50 is set as the movement source in the moving command as received from the host computer, whether or not a medium is detected to be present in the mail slot 50 of the tray 20.

When no medium is present in the mail slot 50, the tray 20 is opened to the mail slot access position and a medium is then manually inserted into the mail slot 50. Subsequently, when the operation of an ejection switch 24 for opening or closing the tray 20 is detected, the tray 20 is moved to the closed position and the medium is conveyed by the accessor 28 from the mail slot 50, as the insertion source, to the assigned slot, set as the insertion destination. In this case, after the tray 20 is opened to the mail slot access position on the basis of the moving command, the medium insertion processing unit 102 monitors the operation of the ejection switch 24. In the case where the operation of the ejection switch 24 is not detected, even after a predetermined time has elapsed, the medium insertion processing unit 102 reports an error to the host computer and, after that, closes the tray 20, the apparatus thereby returning to an initial state.

The medium insertion processing unit 102 also can open or close the tray 20 for a medium insertion operation, responsive to operation of the ejection switch 24. That is, the medium insertion processing unit 102 opens the tray 20 to the mail slot access position upon detecting the operation of the ejection switch 24; it subsequently closes the tray 20 when the on-operation of the ejection switch 24 is detected, and allows the medium to be conveyed by the accessor 28 from the mail slot 50 to the assigned slot, set as the insertion destination, on the basis of a subsequent moving command from the host computer and in which moving command the movement source is set to the mail slot 50.

In this case as well, the medium insertion processing unit 102 monitors the operation of the ejection switch 24; after the tray 20 has been opened to the mail slot access position on the basis of the operation of the ejection switch 24 and when the operation of the ejection switch 24 is not detected even after a predetermined time has elapsed, an error is reported to the host computer and, after that, the tray 20 is closed, thereby returning to the initial state.

Further, the medium insertion processing unit 102 opens or closes the tray 20 for a medium insertion operation by a tray opening command or a tray closing command from the host computer. That is, the medium insertion processing unit 102 opens the tray 20 to the mail slot access position when the tray opening command from the host computer is received, subsequently closes the tray 20 when the tray closing command from the host computer is received, and allows the medium to be conveyed by the accessor 28 from the mail slot 50 to the insertion destination slot on the basis of a subsequent moving command from the host computer in which the movement source is set to the mail slot 50.

In this case, as well, the medium insertion processing unit 102 opens the tray 20 to the mail slot access position on the basis of the tray opening command and, after that, monitors the receipt of the tray closing command. When the tray closing command is not received even after the predetermined time has elapsed, the medium insertion processing unit 102 reports an error to the host computer and, after that, closes the tray 20, thereby returning to the initial state.

On the other hand, when a moving command, in which the movement destination is set to the mail slot 50, is received from the host computer, the medium ejection processing unit 104 controls the accessor 28 to convey the medium from the movement source slot to the mail slot 50 as a destination slot and, after that, opens the tray 20 to the mail slot access position. In this case, the medium ejection processing unit 104 opens the tray 20 to the mail slot access position on the basis of the moving command and, after that, monitors the on-operation of the ejection switch 24. When the on-operation of the ejection switch 24 is not detected even after the predetermined time has elapsed, the medium ejection processing unit 104 reports an error to the host computer and, after that, closes the tray 20, thereby returning to the initial state.

As before noted, a plurality of racks 26, each having a plurality of slots in which the media can be received, are arranged in the tray 20 of the library Apparatus 10, stacked in the first/depth direction. The medium insertion processing unit 102 and the medium ejection processing unit 104, therefore, also are selectively operable to cause the tray 20 to be opened to the fully opened position at which the plurality of racks can be withdrawn or replaced, in the setting state of the normal mode.

Figure 2:
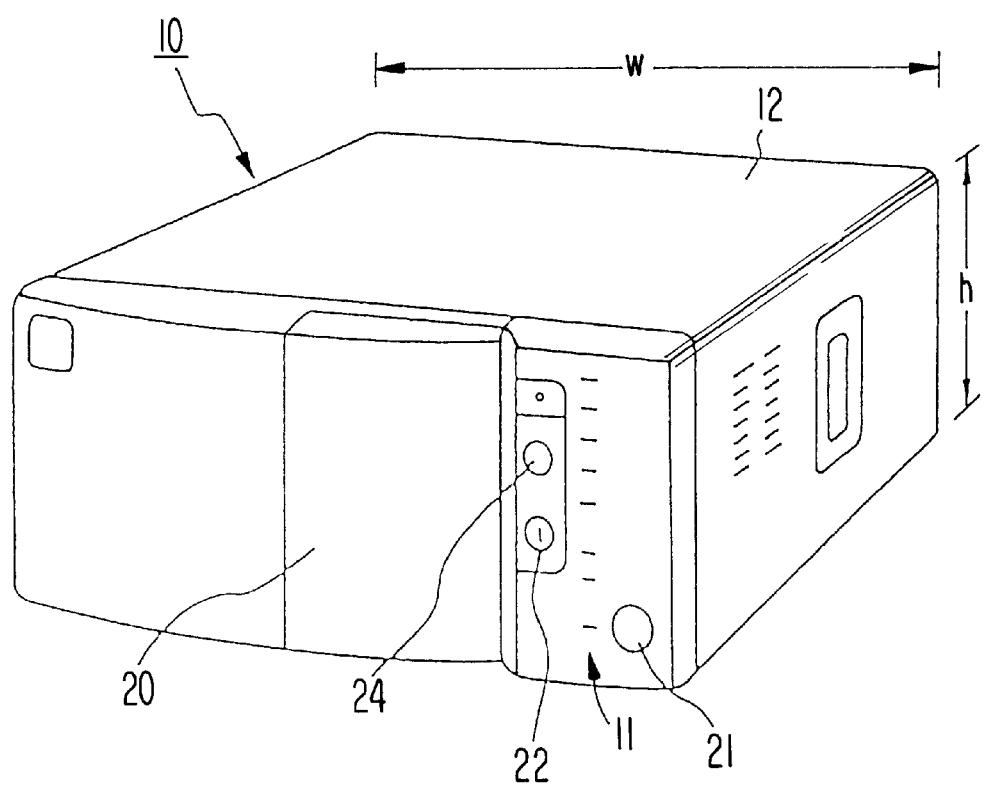
FIG. 2 is a perspective view of an MO library apparatus.

FIG. 2 is a perspective view of the external appearance of a magneto-optic disk library apparatus 10 (hereinafter, an "MO library apparatus") according to the invention. The MO library apparatus 10 has a height "h" which is limited to about ten and a few centimeters and has a main body, or housing, 12 of a flat box shape, larger in the lateral and depth directions than in the height direction. For example, the main body 12 has a very compact size, of a height "h" of about 143 cm (143 mm), a width "w" of about 345 cm (345 mm), and a depth "d" of about 430 cm (430 mm), and can be placed on or beside a desk, in use.

Since an upper surface portion of the main body 12 has a sufficient area such that a width is equal to 340 mm and a depth is equal to 430 mm, a further unit, such as a display, can be also put on the apparatus main body 12 when the main body 12 is put on or beside the desk. A control panel 11 on the right side of the front face of the main body 12 has a power switch 21, a key switch 22, and an ejection switch 24. The tray 20 is provided next to the control panel 11. The tray 20 can be inserted into or withdrawn from the main body 12 along the first/depth direction of the tray 20. As noted before and as further discussed hereinafter, three racks 26-1, 26-2 and 26-3, each thereof holding, or storing, plural optical disk medium cartridges respectively in the plural slots provided therein, are enclosed in the tray 20.

A power source for the apparatus is turned on or off by the power switch 21. The tray 20 is inserted (i.e., moved in) to a closed position or is moved out (i.e., withdrawn) to an open position by operation of the ejection switch 24. The key switch 22 is used to validate or cancel the function of the ejection switch 24. When it is desired to withdraw, or pull out, the tray 20 by operating the ejection switch 24, an exclusively-used key is inserted into the key switch 22 and turned, thereby validating the function of the ejection switch 24. The key switch 22 is usually in the off state, so that even if the ejection switch 24 is operated, the tray 24 is not moved from either one or the other of the inserted (closed) or withdrawn (opened) positions. On the other hand, when the function of the ejection switch 24 is validated by inserting into, and turning, an exclusively-used key in the key switch 22 and the ejection switch 24 is operated in a state where the tray 20 is closed, as shown in FIG. 2, the tray 20 is moved out of (i.e., withdrawn from) the apparatus main body 12 to the opened position.

In the MO library apparatus 10 of the invention, with respect to the insertion and ejection of a medium by opening the tray 20, a selected one of the normal mode and the mail slot mode is set when the power source of the apparatus is turned on. In the normal mode, the tray 20 may be withdrawn, or pulled out, to a fully opened position at which all of the three racks 26-1, 26-2 and 26-3, as are held in the associated, fully opened tray 10, can be removed. In the mail slot mode, on the contrary, the slot 50 in the front-most part of the front rack 26-3 in the tray 20 is defined as the mail slot 50. Thus, where each of the three racks 26 has twelve slots, there are a total of 36 slots, the front-most slot of the front-most rack being the mail slot 50 and the remaining 35 slots being individually designated, selectively, as an insertion destination slot (i.e., for an MO medium being inserted) or a movement source slot (i.e., for an MO medium stored in the system and to be read or ejected). As before described, moreover, the insertion or ejection of media in the mail slot mode is performed on a one-by-one (i.e., an individual) basis.

Figure 3:
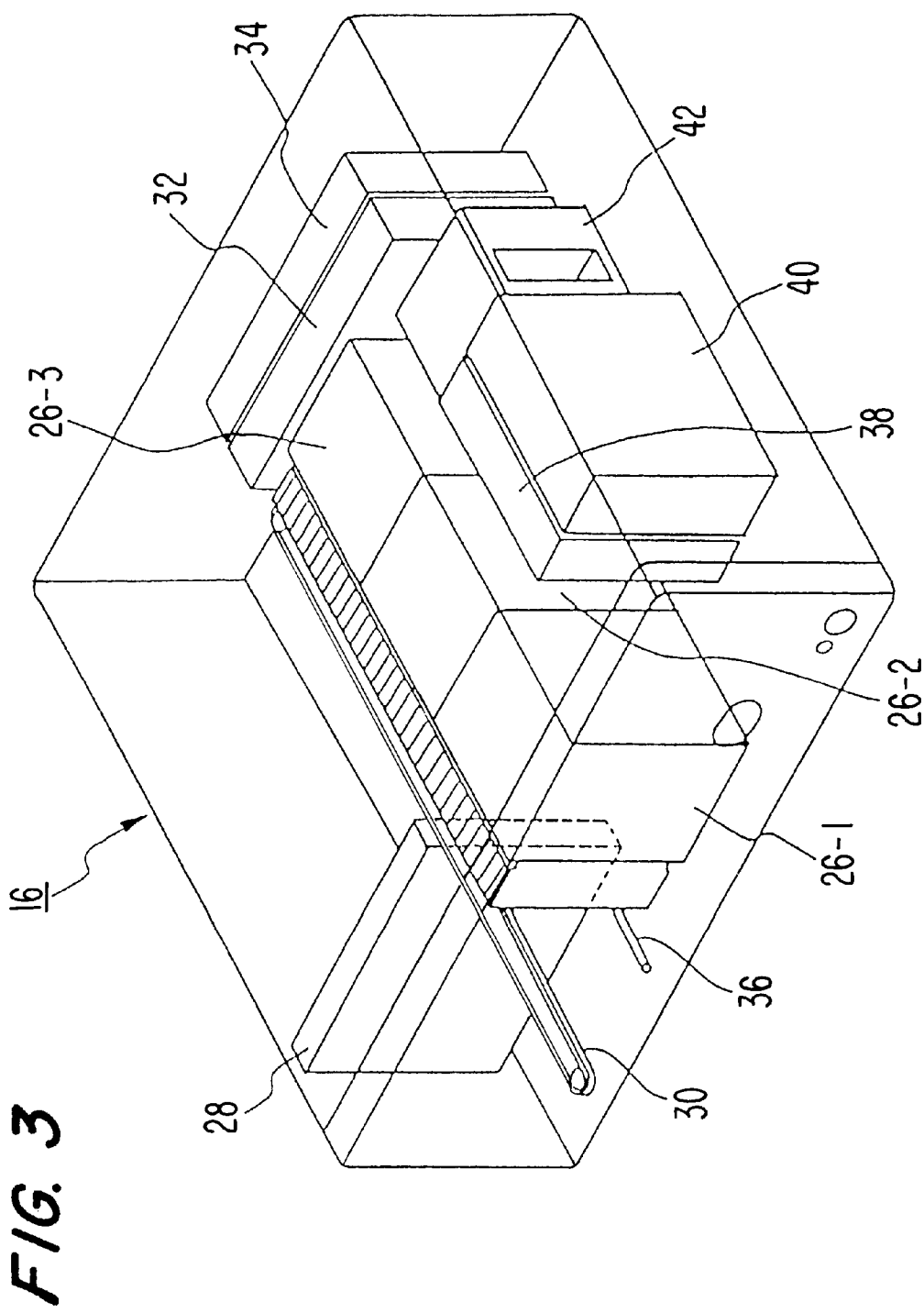
FIG. 3 a perspective view of an internal structure of the MO library apparatus.

FIG. 3 shows an arrangement of components of the main body 12 of FIG. 2, shown in a transparent state in FIG. 3. For example, three magazine racks 26-1, 26-2, and 26-3 are received on the tray 20 (not shown in FIG. 3) which opens toward the front and thus to the lower left in the perspective view of FIG. 3. The racks 26-1 to 26-3 are open, likewise toward the left side, when they are seen from the front, in the orientation of the housing 12 shown in FIG. 3. Also as before noted, each rack has twelve (12) slots and thus may hold twelve (12) corresponding MO cartridges, each of 3.5 inches diameter. The total number of slots which can enclose MO cartridges consequently is equal to thirty-six (36). Since (at least) one of the slots is used as a mail slot, however, only thirty-five (35) slots (i.e., as a maximum) actually can be used for storage of MO cartridges.

The accessor 28 is installed on the left side of the racks 26-1 to 26-3 as seen in FIG. 3, so as to be movable in the first/depth direction. The accessor 28 is driven by a gear belt and moves along a guide rail 36. The accessor 28 has a pick, functioning as a robot hand, for inserting or ejecting individual MO cartridges into/from selected slots of the racks 26-1 to 26-3.

Two drives, comprising a first MO drive 32 and a second MO drive 34, are installed behind the racks 26-1 to 26-3. Each of the first and second MO drives 32 and 34 has an MO cartridge inserting/ejecting port on the left side, on which the accessor 28 is positioned. The accessor 28 consequently picks up an MO cartridge from any one of the racks 26-1 to 26-3, conveys (i.e., carries) the MO cartridge selectively to the designated one of the first MO drive 32 and the second MO drive 34, i.e., designated as a destination in the move command, and inserts same therein.

A cartridge ejected from the first MO drive 32 or the second MO drive 34, designated as a source, likewise is conveyed by the accessor 28 to the original storage location thereof in the corresponding slot of one of the racks 26-1 to 26-3. The time required for the accessor 28 to take the cartridge from the rack and insert same into the MO drive is called a cartridge conveying time. As a cartridge conveying time, a high speed process of an average of five seconds has been realized.

An accessor controller 38 and a power supply unit 40 are provided in the housing 10, to the right of the racks 26-1 to 26-3 as seen in FIG. 3. The accessor controller 38 drives the accessor 28 and tray 20. A dip (selector) switch (not shown), for setting a selected one of the normal mode and the mail slot mode, is provided on a circuit board of the accessor controller 38.

When the dip switch is set to the normal mode, therefore, a state of the dip switch is read when the power source of the apparatus is turned on and the normal mode is set. When the dip switch is switched to the mail slot mode, the state of the dip switch is read when the power source of the apparatus is turned on, and the mail slot mod: is set.

The power supply unit 40 supplies power to the entire apparatus. A fan unit 42 with an air purifying filter is provided on the right side of the power supply unit 40. The fan unit 42 intakes the air from an air inlet port and through the filter into the interior of the apparatus 10 and blows the air or the components therein, forcibly cooling same. The cooled air, produced by the fan unit 42 with the filter, is circulated within the apparatus and, after that, passes over the power supply unit 40 and finally is exhausted to the outside the housing 12.

Figure 4:
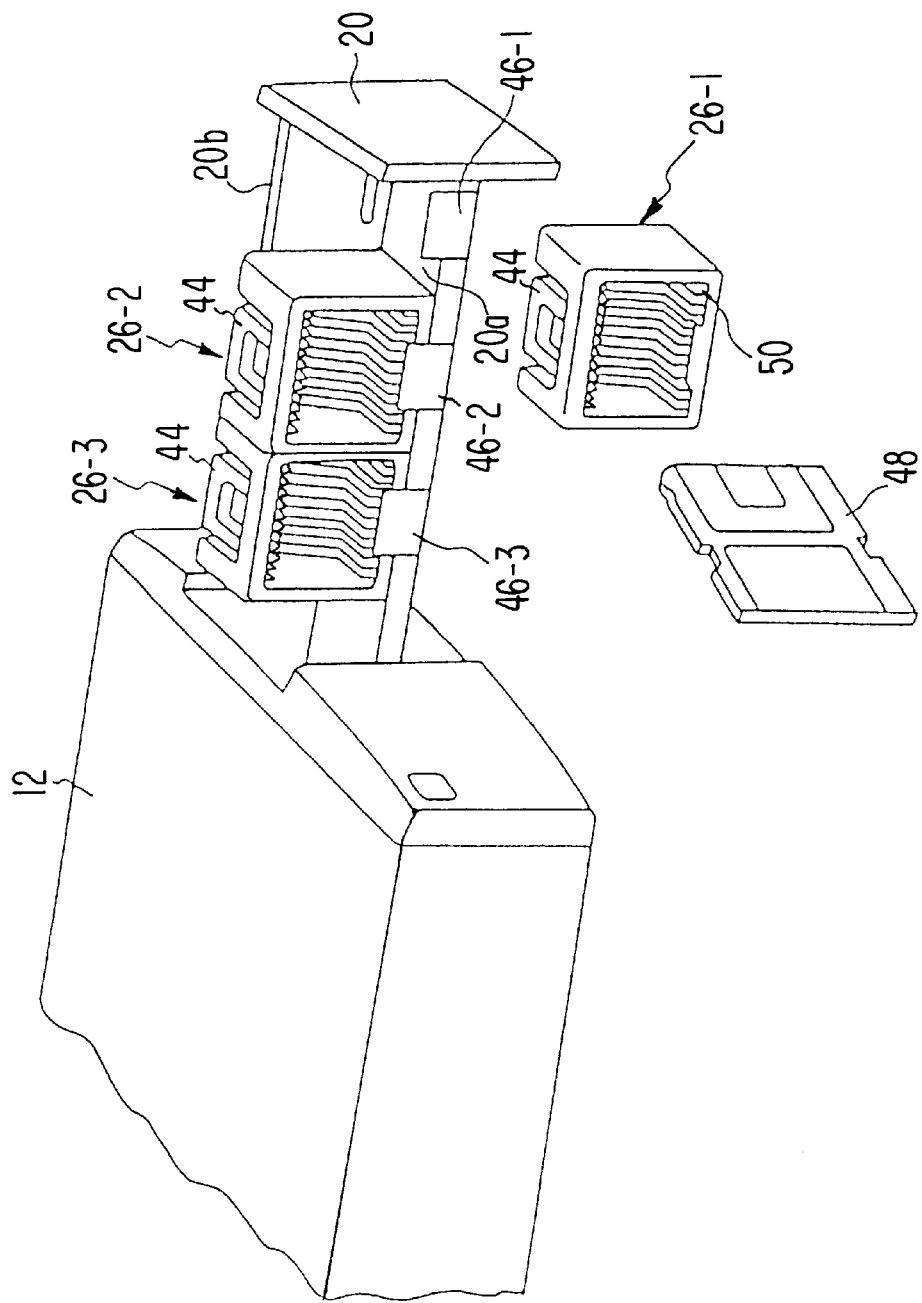
FIG. 4 is a perspective view of a library apparatus according to the invention having a tray opened in a normal mode, as in FIG. 1(B) but on an enlarged scale.

FIG. 4 shows a state in which the tray 20 is in the fully opened position in the normal mode of the library apparatus 10 of the invention and, wherein, the three racks 26-1 to 26-3 are accessible. The inside of the tray 20 defines a shelf, or bottom wall, 20a and a vertical sidewall 20b (in the orientation of FIG. 4) and thus has an L-shaped cross section; further, stoppers 46-1 to 46-3 are affixed to the free side edge of the bottom plate 20, to maintain the respective racks 26-1, 26-2 and 26-3 in position on the bottom plate 20a.

Figure 5:
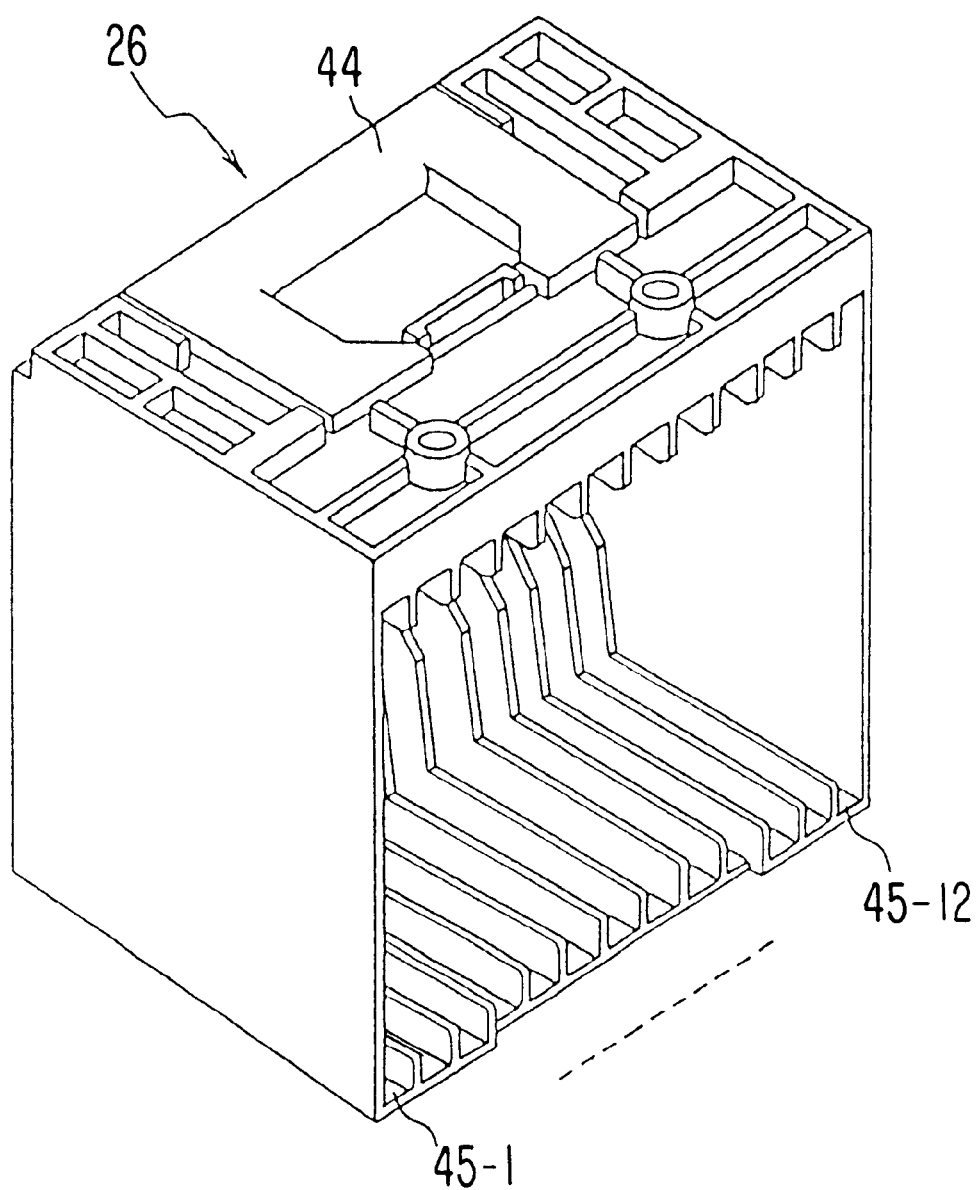
FIG. 5 is a perspective view of a rack insertable in a tray of the apparatus of FIG. 4.

As shown in FIG. 5, each of the racks 26-1 to 26-3 has a handle 44 on an upper surface thereof and twelve (12) slots 45-1 to 45-12 on an interior thereof for receiving respective, individual MO cartridges therein. In the normal mode in which the tray 20 is fully opened, the insertion or ejection of cartridge media is executed on a rack-by-rack unit basis in a manner such that for the rack 26-3, for example, the handle 44 is grasped and the rack is lifted vertically and thereby removed from the tray 20, an MO cartridge 48 is inserted, exchanged, or the like for each of one or more of the slots of the removed rack 26-3 and, after that, the rack 26-3 is returned to its assigned position in the tray 20.

Figure 6:
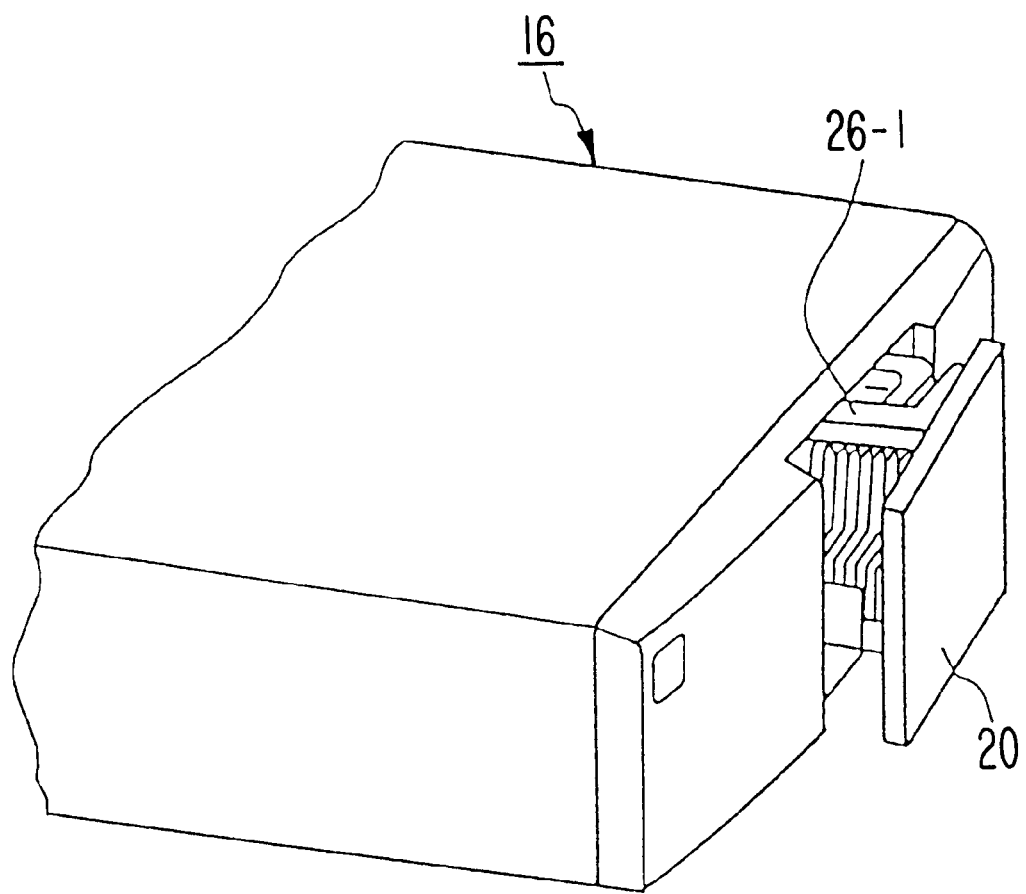
FIG. 6 is an enlarged view of the apparatus of the invention in the mail slot mode of operation, as in FIG. 1C but on an enlarged scale relatively thereto, and illustrating the mail slot access position of the tray.

FIG. 6 shows the tray opened to the mail slot access position in the mail slot mode of operation of the MO library apparatus of the invention. In the mail slot mode, for example, a slot on the outermost, or front, edge of the rack 26-3, which in turn is disposed on the front-most position of the tray 20 in FIG. 3, is defined as the mail slot 50. In the mail slot mode, as shown in FIG. 6, the tray 20 is consequently opened to the mail slot access position, constituting a limited opening amount, sufficient to permit the medium to be inserted or ejected manually into/from the mail slot 50.

For example and as shown in FIG. 6, in the medium insertion operation, the MO cartridge is inserted into the mail slot 50, disposed at the front-most position of the tray in the limited open state of the tray 20, and the tray 20 then is closed by operating the ejection switch 24; the accessor then is made operative by a moving command, and the MO cartridge is conveyed from the mail slot, as a source slot, to an assigned slot in the tray, designated as a movement destination slot, thereby completing the insertion control of the medium.

On the other hand, in the medium ejecting operation, the accessor conveys the MO cartridge from the assigned slot thereof, designated as a source by the moving command, to the mail slot, designated as a destination; when the conveyance is finished, the tray 20 is opened to the mail slot access position, as shown in FIG. 6, thereby enabling the medium to be manually removed from the mail slot.

Figure 7:
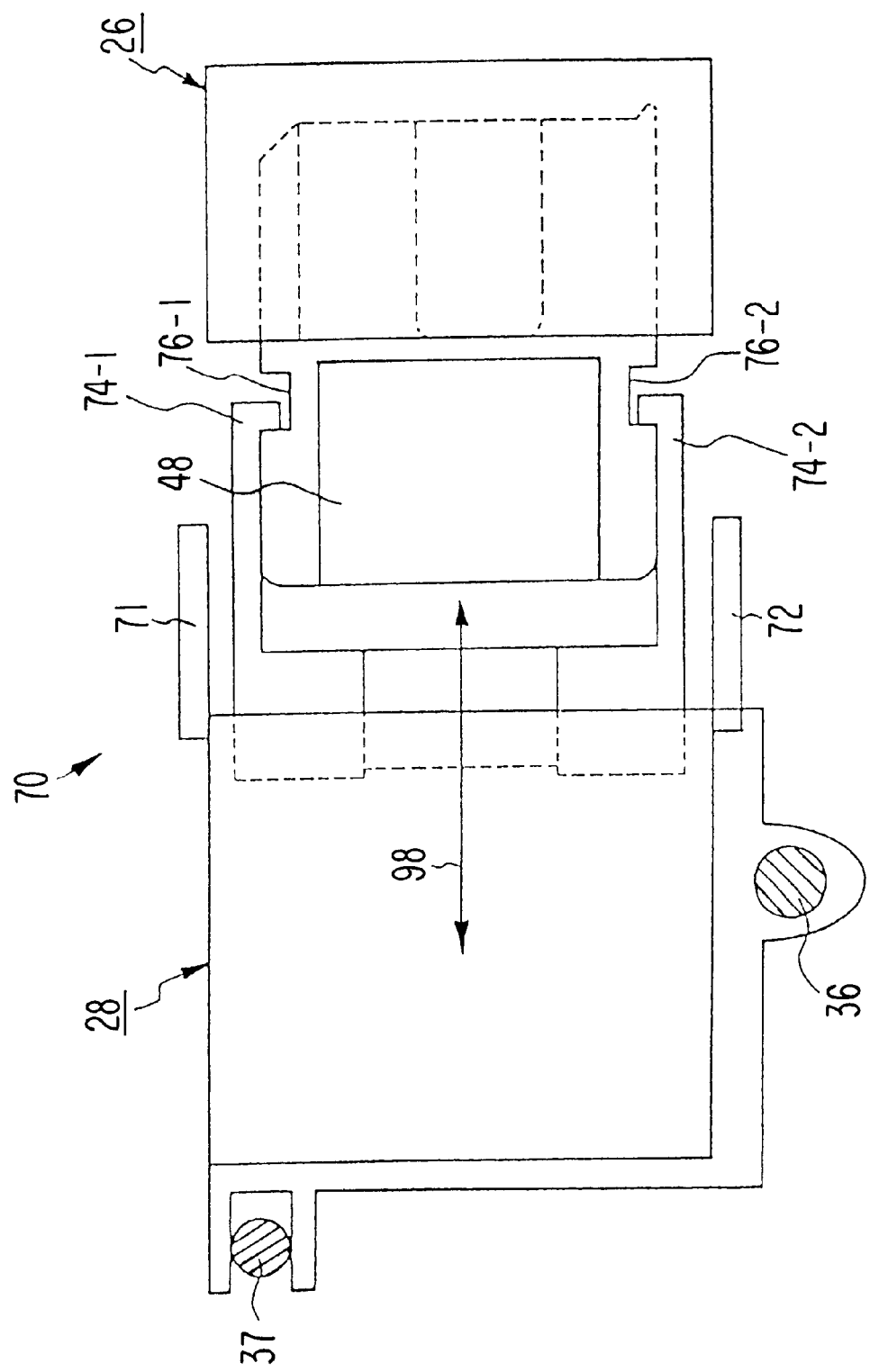
FIG. 7 is a diagram illustrating operation of an accessor of the library apparatus, performing a medium ejection operation.

FIG. 7 is an explanatory diagram of a medium ejecting mechanism operated by the accessor 28 provided in the main body 12 in FIG. 3. The accessor 28 is moved in the first/depth direction along the lower guide rail 36 and a guide rail 37 on the upper left side (as seen in FIG. 7). A pair of selectively closable pickers 74-1 and 74-2 having respective picker extensions 74-1a and 74-1b are provided at upper and lower, spaced positions and disposed toward the rack 26. The picker extensions 74-1a and 74-1b are selectively inserted into the concave portions, or notches, 76-1 and 76-2, respectively on the upper and lower edges of the MO cartridge 48 held in the slot of the rack 26, aligned with the pickers 74-1 and 74-2; the medium 48 then is pulled toward the accessor 28, as shown by the left arrowhead of doubleheaded arrow 98, and thereby is moved in the second/lateral direction to the left, for ejecting (or oppositely, to the right, for inserting/loading) the medium 48.

Spaced outwardly of the pickers 74-1 and 74-2 of the accessor 28 is a presence sensor 70 comprising a light emitting unit 71 provided on the upper side thereof and a photosensor unit 72 provided on the lower side thereof. In an ejecting operation of a specific medium 48 held in a respective slot in the rack 26, the accessor 28 is moved in the first/depth direction such that the pickers 74-1 and 74-2 are aligned with, and are then advanced laterally along, the respective upper and lower edges of the specific medium 48 in the right direction of the arrow 98; the projections 74-1a and 74-1b then are advanced inwardly into the corresponding notches 76-1 and 76-2 respectively in the upper and lower edges of the medium 48, such that the latter extend into and thereby engage the respective notches 76-1 and 76-2. The pickers 74-1 and 74-2 then are retracted into the accessor 28, moving laterally in the left direction of the arrow 98. In that movement, the medium 48 blocks the light beam from the light emitter 70, shielding the light sensor 72 and discontinuing any detector output therefrom. Since the sensor 72 normally receives the light beam from the light emitter 70 and produces a corresponding output, the absence of that output functions as a detection signal indicating that the medium 48 has been successfully retrieved by the accessor 28. When the accessor 28 is moved in the depth direction and positioned in a state where the pickers 74 are retracted into the accessor 28, as shown by the arrow 98, a light from the sensor light emitting unit 70 is shielded by the medium and does not enter the sensor photosensitive unit 72. The absence of a photosensor signal output of the sensor 72 thus affords a detection signal that the MO cartridge 48 has been received.

In an initializing process performed when the power source of the apparatus is turned on, the accessor 28 normally reciprocates once in the first/depth direction, the presence sensor 70 thereby effectively scanning the successively aligned slots to detect the presence or absence of a cartridge/medium 48 in each thereof. Thereby, a table of information is prepared indicative of the presence or absence of an MO cartridge 48 in each of the slots of the rack thus scanned by the presence sensor 70.

Figure 8:
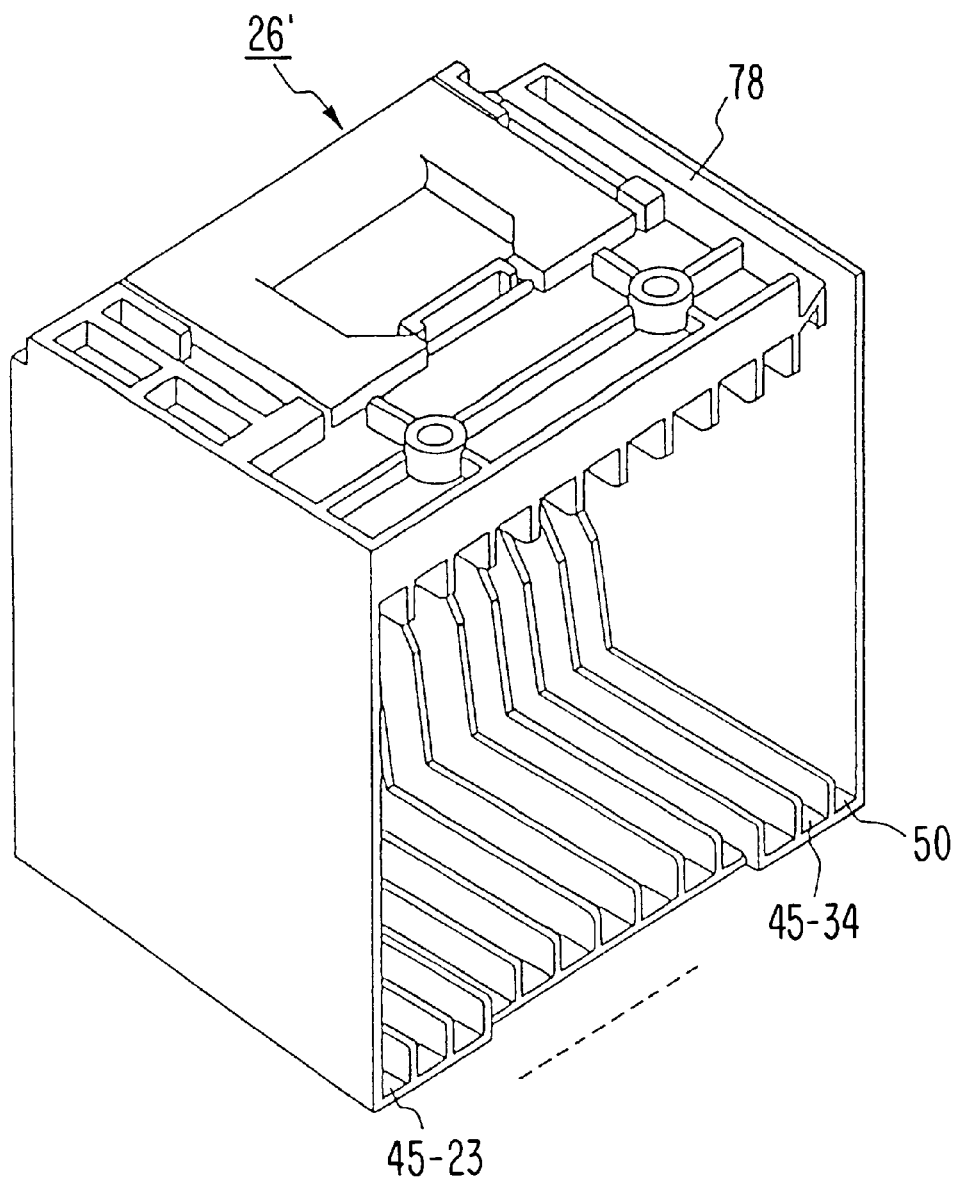
FIG. 8 is a perspective view of a rack having a mail slot.

FIG. 8 shows a second embodiment of a rack 26' usable in the MO library apparatus of the invention. The rack 26' is used as the rack 26-3, which is positioned in the front-most portion of the tray 20 in FIG. 3 and the front-most slot of which is set as the mail slot 50. In the rack 26 in FIG. 5, the MO cartridge has to be ejected, i.e., taken out, by movement in the lateral direction in the limited open state of the tray 20 in the mail slot mode, creating a concern that it may be difficult to eject the MO cartridge. By contrast, in the embodiment of FIG. 8, a mail slot upper ejecting port 78 is provided through which the medium is moved, either for insertion into or for being withdrawn from the mail slot 50 when the tray 20 is opened to the mail slot access position in the mail slot mode of operation.

Figure 9:
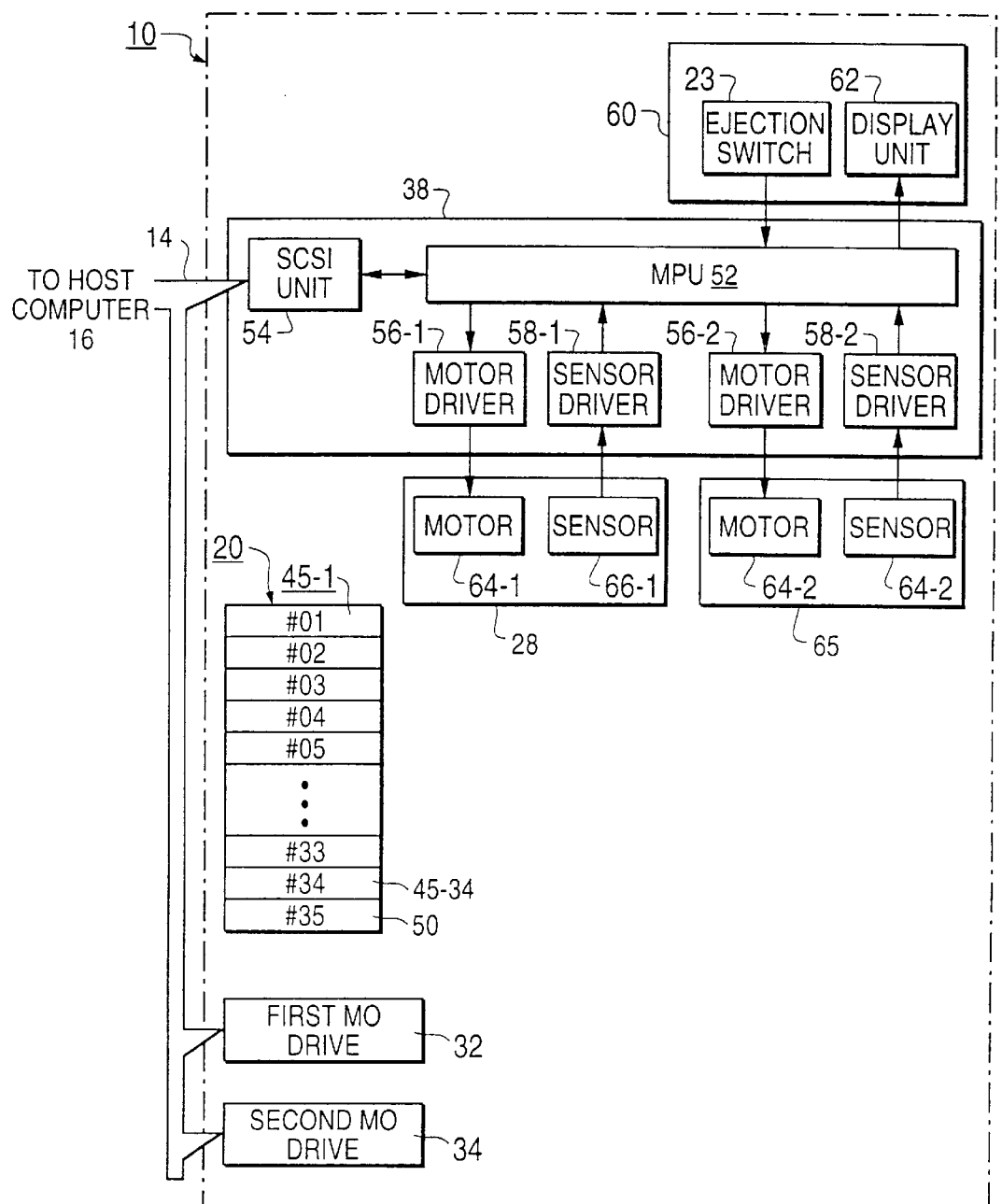
FIG. 9 is a block diagram illustrating the arrangement of hardware elements of the library apparatus of the invention.

FIG. 9 is a block diagram of a hardware arrangement of the MO library apparatus 10 of the invention. In FIG. 9, an SCSI bus 14 from a host computer 16 is connected to the accessor controller 38, a first MO drive 32, and a second MO drive 34.

The accessor controller 38 has an MPU 52 functioning as a logic controller and executes a mode setting control, a medium insertion control, a medium ejection control, and a read/write medium conveyance control, by corresponding program controls of the MPU 52. Specifically, an accessor control and a tray opening/closing control for each of the medium insertion, medium ejection, and medium read/write conveyances are executed. The MPU 52 is connected to the SCSI bus 14 from the host computer 16 via an SCSI unit 54 and controls a motor driver 56-1 to drive a motor 64-1 provided for the accessor 28.

A sensor 66-1 for detecting a cartridge position is provided for the accessor 28; more specifically, a sensor driver 58-1 for outputting detection signals of the sensor light emitting unit 70 and sensor photosensitive unit 72 in FIG. 7, a motor driver 56-2 for driving a motor 64-2 provided for a tray driving unit 65, and a sensor driver 58-2 for outputting a detection signal of a sensor 66-2 to detect a tray position, are connected to the MPU 52. Further, various switches, including the ejection switch 24 provided on the operation control panel 60, and a display unit 62 having a display indicator are connected to the MPU 52. As for the tray 20, slots 45-1 (+01) to 45-34 (+34) and a mail slot 50 (+35) are shown.

Figure 10:
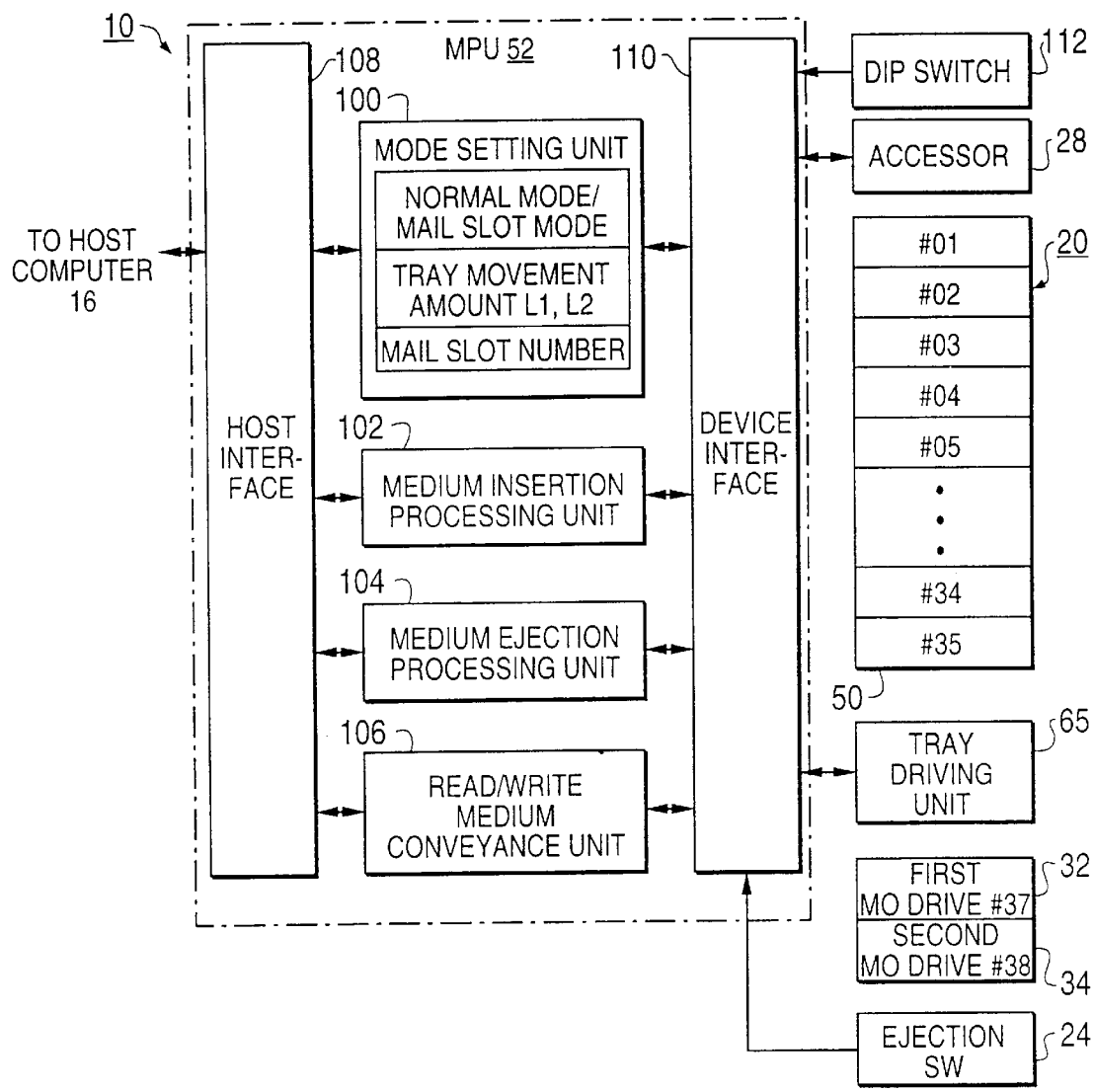
FIG. 10 is a functional block diagram of the library apparatus of the invention, as in FIG. 1(A)

FIG. 10 is a functional block diagram of the MPU 52 of the accessor controller 38 of FIG. 9. In FIG. 10, a host interface 108, connected to the host computer 16, and a device interface 110, connected to various types of equipment, are provided for the MPU 52. The accessor 28, a tray driving unit 65 and a dip switch 112, the latter for setting a mode of operation, are connected to the device interface 110.

So The mode setting unit 100 sets the apparatus to the selected one of the normal (first) mode and the mail slot (second) mode in accordance with a respective switching state of the dip switch 112 when the power source is turned on. For the normal mode and as shown in FIG. 3, a tray movement amount, as is required to pull out the tray 20 to a predetermined fully opened position, is set as a tray movement amount L1. For the mail slot mode and as shown in FIG. 6, a tray movement amount L2 is set, corresponding to the tray 20 being pulled out to the mail slot access position in which the medium can be inserted or ejected into/from the front-most mail slot in the tray 20. At the same time, since the slot numbers are allocated in the sequence of #01, #02, . . . , from the rear position of the tray 20 to the front, in the illustrative embodiment, the slot number #35 on the front-most side is defined as the mail slot 50.

One of the normal mode and the mail slot mode, which is set selectively by the mode setting unit 100, can be switched and set by the dip switch 112 provided on the circuit board of the MO library apparatus. However, a mode change switch can be also provided on the operation panel on the front right side of the main body 12 of the MO library apparatus 10 shown in FIG. 2. Further, one of the normal mode and the mail slot mode also can be selectively set on the basis of a mode setting command from the host computer 16.

When the medium is inserted into the mail slot #35 in the setting state of the mail slot mode, the medium insertion processing unit 102 opens the tray 20 to the mail slot access position as shown in FIG. 6 to permit insertion of a medium therein, closes the tray 20 after the medium is inserted, and allows the accessor 28 to convey the medium from the mail slot 50 to the assigned slot therefore in the tray 20, as the insertion destination. When the medium is ejected, in the mail slot mode, a medium ejection processing unit 104 allows the accessor 28 to convey the medium from the assigned slot, as the movement source, to the mail slot 50, as the destination, and, after that, opens the tray 20 to the limited amount shown in FIG. 6, to permit manually removing the ejected medium from the mail slot 50.

As processing forms for a medium insertion operation according to the mail slot mode of operation of the medium insertion processing unit 102, there are the following three forms:

<1> Control by a moving command by which the movement source is set to the slot #35 of the mail slot 50.
<2> Control solely by operation of the ejection switch 24.
<3> Control by tray opening and tray closing commands from the host computer apparatus.

First, the medium insertion control by the moving command, in which the movement source is set to the slot #35 of the mail slot 50, is as follows. It is now assumed that the slot # of the movement destination designated by the moving command is set to #j, where #j is an arbitrary number other than the slot #35 of the mail slot 50.

In the medium insertion control by the moving command, in which the movement source is set to the slot #35 of the mail slot 50, as received from the host computer 16, the medium insertion processing unit 102 first detects whether or not the medium has been inserted in the mail slot 50. When the medium is not inserted in the mail slot 50, this means that insertion of the medium into the mail slot 50 is not finished; the tray 20 therefore remains open, at the mail slot position, and the apparatus waits for the insertion of the medium.

As shown in FIG. 6, when the tray 20 is opened to a state in which the medium can be inserted into the mail slot 50, the operator inserts the MO cartridge into the mail slot 50, depresses the ejection switch 24, and closes the tray 20. In the medium insertion processing unit 102, therefore, the operation of the ejection switch 24 is monitored in a state in which the tray 20 is opened to the mail slot position, such that when the operation of the ejection switch 24 is detected, the tray 20 is closed, and the MO cartridge is subsequently conveyed by the accessor 28 from the mail slot 50 to the insertion destination slot #j.

On the other hand, when the MO cartridge has already been inserted into and received in the mail slot 50, and thus since the insertion by the operator has already been finished, the MO cartridge is immediately conveyed by the accessor 28 from the mail slot 28 to the slot No. #j of the movement destination designated by the moving command.

In the medium inserting process controlled by the moving command, in which the source slot No. #35 is set to the mail slot 50, after the tray 20 is opened to the mail slot position on the basis of the moving command, the switching operation of the ejection switch 24 is monitored by a timer.

When the operation of the ejection switch 24 is not detected even after a predetermined time has elapsed, namely, when the operator leaves the tray 20 in an open state, an error is reported to the host computer 16 and, after that, a recovering process to close the tray 20 and to return to an initial state is executed. The recovering process can be executed by closing the tray 20 by the operation of the ejection switch 24, by again generating the moving command in which the movement source is set to the slot #35 of the mail slot 50 from the host computer 16, or by issuing the tray closing command.

In the inserting process, using only the operation of the ejection switch 24 by the medium insertion processing unit 102, when the operation of the ejection switch 24 is detected, the tray 20 is opened to the mail slot access position in FIG. 6. Subsequently, when the operation of the ejection switch 24 is detected, the tray 20 is closed. After that, on the basis of the moving command from the host computer 16 in which the movement source is set to the slot No. #35 of the mail slot 50 and the movement destination is set to another arbitrary slot #j, the MO cartridge is conveyed by the accessor 28 from the mail slot 50 to the movement destination slot #j.

In this case as well, after the tray 20 is opened to the mail slot position by the operation of the ejection switch 24, the next operation of the ejection switch 24 is monitored by the timer. When the operation of the ejection switch 24 is not detected even after the elapse of a predetermined time, an error is reported to the host computer 16 and, after that, the recovering process to close the tray is executed.

Further, in the insertion control by the medium insertion processing unit 102, when the tray opening command from the host computer 16 is received, the medium insertion processing unit 102 opens the tray 20 to the mail slot access position shown in FIG. 6. Subsequently, when the tray closing command from the host computer 16 is received, the tray 20 is closed.

After that, on the basis of the moving command from the host computer 16 in which the movement source is set to the slot #35 of the mail slot 50 and the movement destination is set to a different, arbitrary slot #j, the MO cartridge is conveyed by the accessor 28 from the mail slot 50 to the insertion destination slot.

With respect to the medium insertion control by a host, after the tray 20 is opened to the mail slot access position on the basis of the tray opening command from the host computer, the receipt of the next tray closing command is monitored by the timer. When the tray closing command is not received even after the elapse of a predetermined time, an error is reported to the host computer 16. After that, the tray is closed and the recovering process, to return to the initial state, is executed.

On the other hand, in the medium ejection processing unit 104, when the moving command, in which the movement source is set to the slot #i of an arbitrary slot other than the mail slot 50 and the movement destination is set to the slot #35 of the mail slot 50, is received from the host computer 16 in the setting state of the mail slot mode, the MO cartridge is conveyed by the accessor 28 from the movement source slot to the mail slot 50 and, after that, the tray 20 is opened to the mail slot access position in FIG. 6.

In the medium ejecting process, after the tray 20 is opened to the mail slot access position on the basis of the moving command, the medium ejection processing unit 104 monitors the operation of the ejection switch 24 by the timer. When the operation of the ejection switch 24 is not detected even after the elapse of a predetermined time, namely, in the case where the operator does not take out the medium or, even if the medium was taken out but the tray is left in the open state, an error is reported to the host computer 16 and, after that, the tray is closed and the recovering process to recover to the initial state is executed.

In the tray opening/closing control in the normal mode, the tray 20 is controlled to a fully opened state or a fully closed state by operation of the ejection switch 24 or in accordance with a host command.

A read/write medium conveyance processing unit 106 provided for the MPU 52 moves the MO cartridge between the source slot of the tray 20 and a specified one of the first MO drive 32 or the second MO drive 34, as a destination, on the basis of the moving command which is generated by the host computer 16 and transmitted to the MO library apparatus 10 in association with the read or write access, in a state in which the tray 20 is closed due to the insertion or the ejection of the medium.

That is, at the time of the read access, the moving command—in which an arbitrary slot number, from among the slot #0 to #34 and excluding #35 (i.e., the mail slot 50 of the tray 20), is set to the movement source and the MO drive 32 or 34 is set to the movement destination —is generated. On the basis of the moving command, the MO cartridge is conveyed from the source slot to the specified MO drive and is loaded therein, thereby allowing a reading or writing operation to be performed thereon.

When the reading or writing operation is finished, the moving command to return the medium to the slot, namely, the moving command in which the first or second MO drive 32 or 34 is set to the movement source and the assigned slot number of the tray 20 is set to the movement destination is generated by the host computer. On the basis of the moving command, the read/write medium conveyance processing unit 106 takes the medium out from the specified MO drive (source) and returns the MO cartridge to the assigned slot (destination) of the tray 20.

To make it easy to perform the respective address designations of the movement source and of the movement destination by the moving command from the host computer, for the slots #01 to #35 of the tray 20, the slot #00 is allocated to the accessor 28 and the slot Nos. #37 and #38 are allocated to the first MO drive 32 and second MO drive 34. The slots #00 to #38 thus are the addresses of the moving command.

Figure 11:
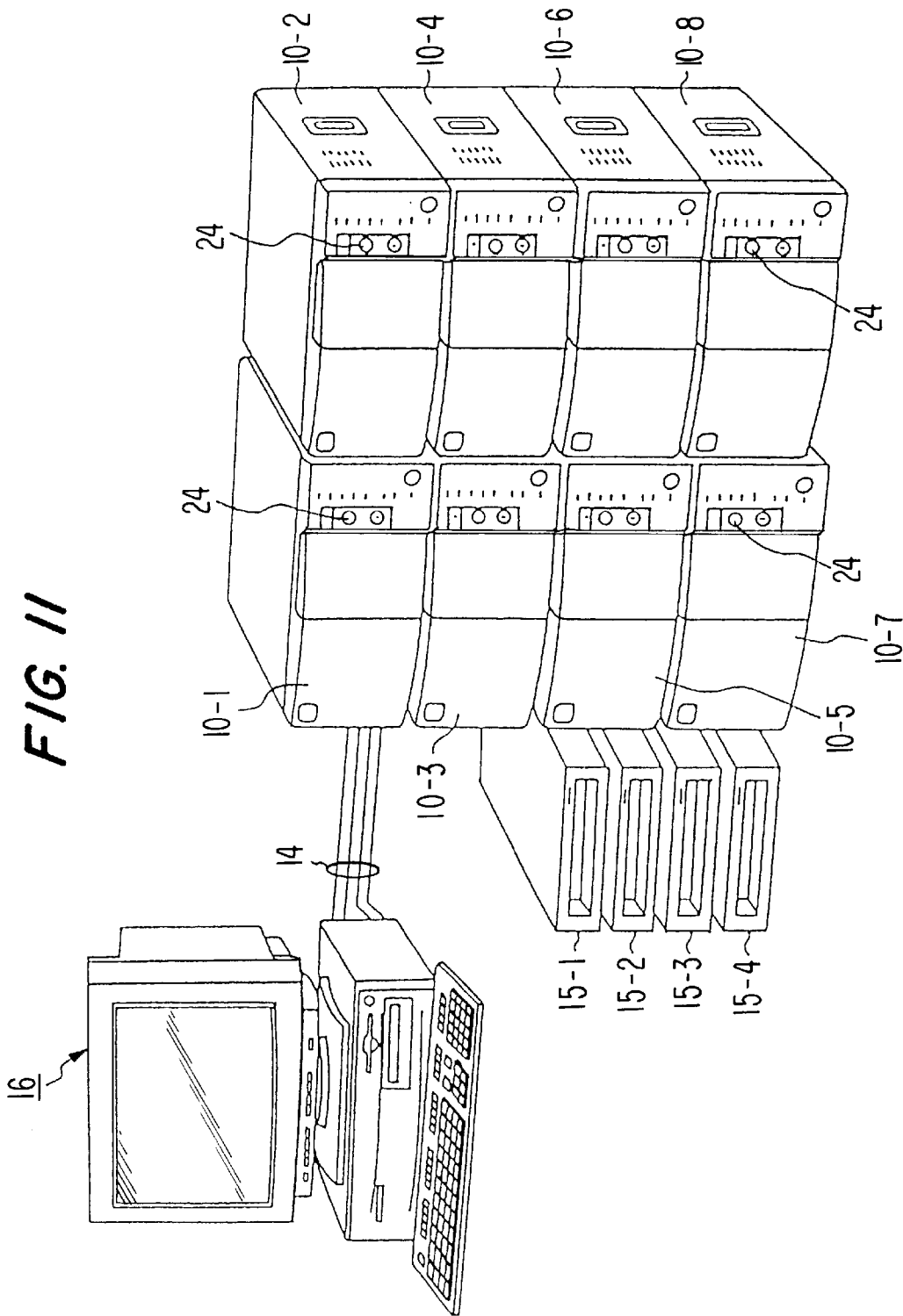
FIG. 11 illustrates an operating system having plural library apparatuses in accordance with the present invention, coupled to a host computer.

FIG. 11 is an explanatory diagram of an optical storage system using the MO library apparatus of the invention. For example, a personal computer is used as the host computer 16. In the illustrative system shown in FIG. 11, four MO drive units 15-1 to 15-4 and eight MO library apparatuses 10-1 to 10-8 of the invention are connected as external storage apparatuses for the host computer 16. For example, the MO drive units 15-1 to 15-4 and the MO library apparatuses 10-1 to 10-8 of the invention are connected to the host computer 16 by the bus 14, comprising SCSI buses of four systems by using four SCSI cards.

Figure 12:
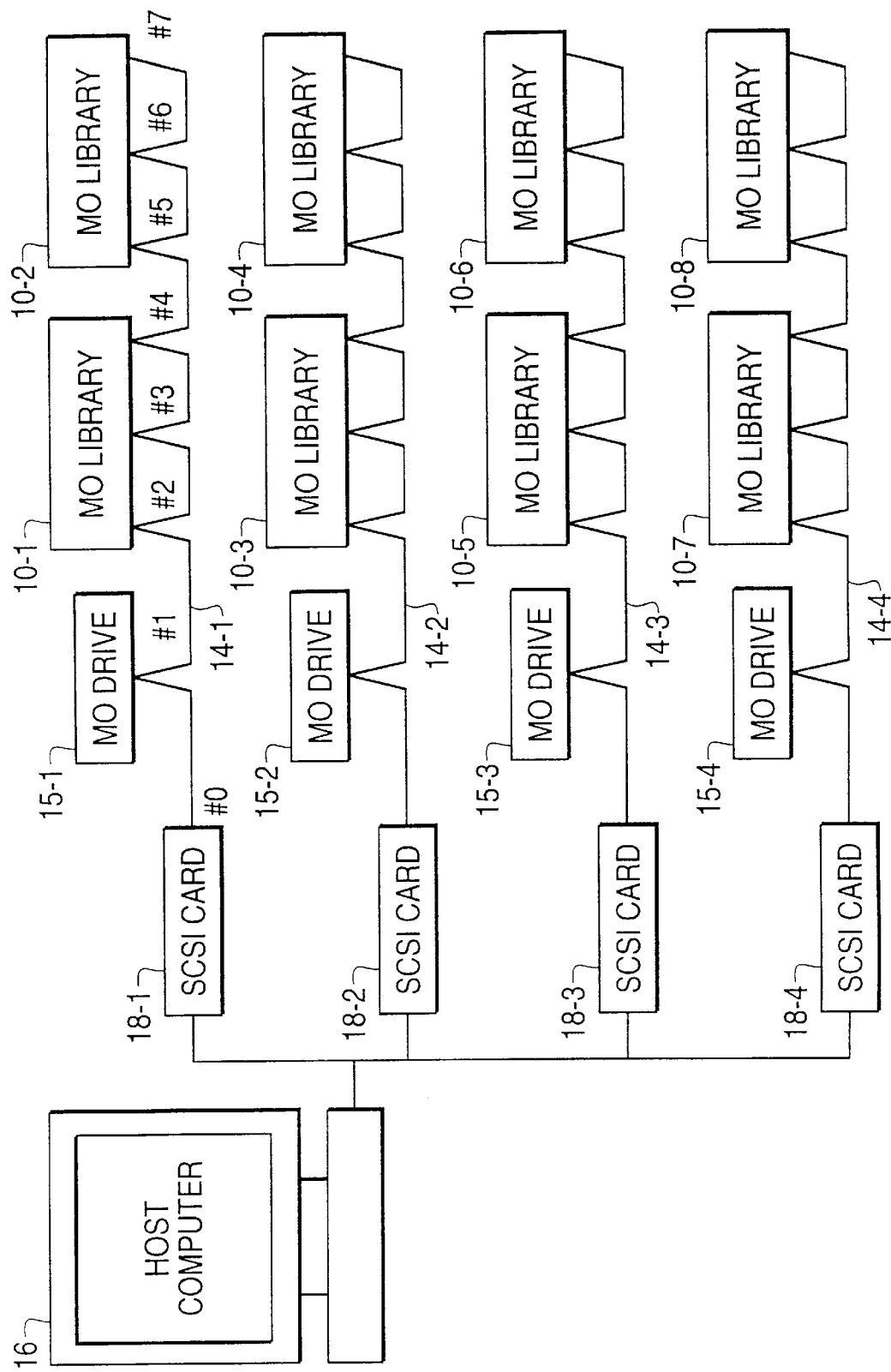
FIG. 12 is an explanatory diagram of the system of FIG. 11.

FIG. 12 is a block diagram of the system interconnections of FIG. 11. SCSI buses 14-1 to 14-4 of four systems are led out from the host computer 16 by SCSI cards 18-1 to 18-4 which function as host adapters. Up to eight devices can be connected to the SCSI buses 14-1 to 14-4 and ID=#0 to #7 are allocated to respective device connecting ports.

In the system shown, the SCSI cards 18-1 to 18-4 serving as host adapters, or interfaces, are connected as ID=#0 to the SCSI buses 14-1 to 14-4 of four systems and, further, MO drive units 12-1 to 12-4 and two sets of MO library apparatuses (10-1, 10-2) to (10-7, 10-8) are connected. Since the MO library apparatuses 10-1 to 10-8 of the invention each have therein an accessor and two MO drives, three SCSI ports are allocated thereto, respectively.

For example, in case of the SCSI bus 14-1, the MO drive unit 15-1 is set to ID=#1, the accessor of the MO library apparatus 10-1 is set to ID=#2, the first MO drive unit is set to ID=#3, the second MO drive unit is set to ID=#4, the accessor of the MO library apparatus 10-2 is set to ID=#5, the first MO drive unit is set to ID=#6, and the second MO drive unit is set to ID=#7.

FIG. 13 shows a medium management table 114 provided for the MO library apparatus 10-1, as an example, among the library apparatuses of the invention used in the system of FIG. 11. The medium management table 114 is formed to include the slot #01 to be slot #35, a medium flag which is indicative of the presence or the absence of a medium in the slot and, further, a status which is indicative of a status of the medium.

The medium flag is set to ON in the medium enclosing (i.e., present) state and is set to OFF in the medium not-enclosing (i.e., absent) state. As for the set and reset of the medium flag, the sensor 70, including the light emitting unit 70 and the sensor 72 provided for the accessor 28 in FIG. 7, is used. The accessor 28 is reciprocated in the first/depth direction at the time of power-on of the apparatus, and the flags are registered in accordance with the physical presence/absence result of scanning the medium enclosed in the tray.

After the medium management table 114 is once formed, when a slot becomes empty, or vacant, resulting from the medium ejecting process, the medium flag for that slot is switched from ON to OFF. As for a slot designated to receive a medium, but which medium is not yet inserted, the flag is set from OFF to ON when the medium is inserted by the medium inserting process. Further, respective statuses "D1" and "D2" of the slot Nos. #10 and #11 denote that the media in those slots have been moved, currently, to the first and second MO drives 32 and 34.

Further, in the mail slot mode according to the invention, the slot #35 is defined as the mail slot 50; usually, no medium is present in the mail slot, so that the medium flag is normally reset to OFF. The status of the mail slot 50 is set to "MAIL".

Figure 14:
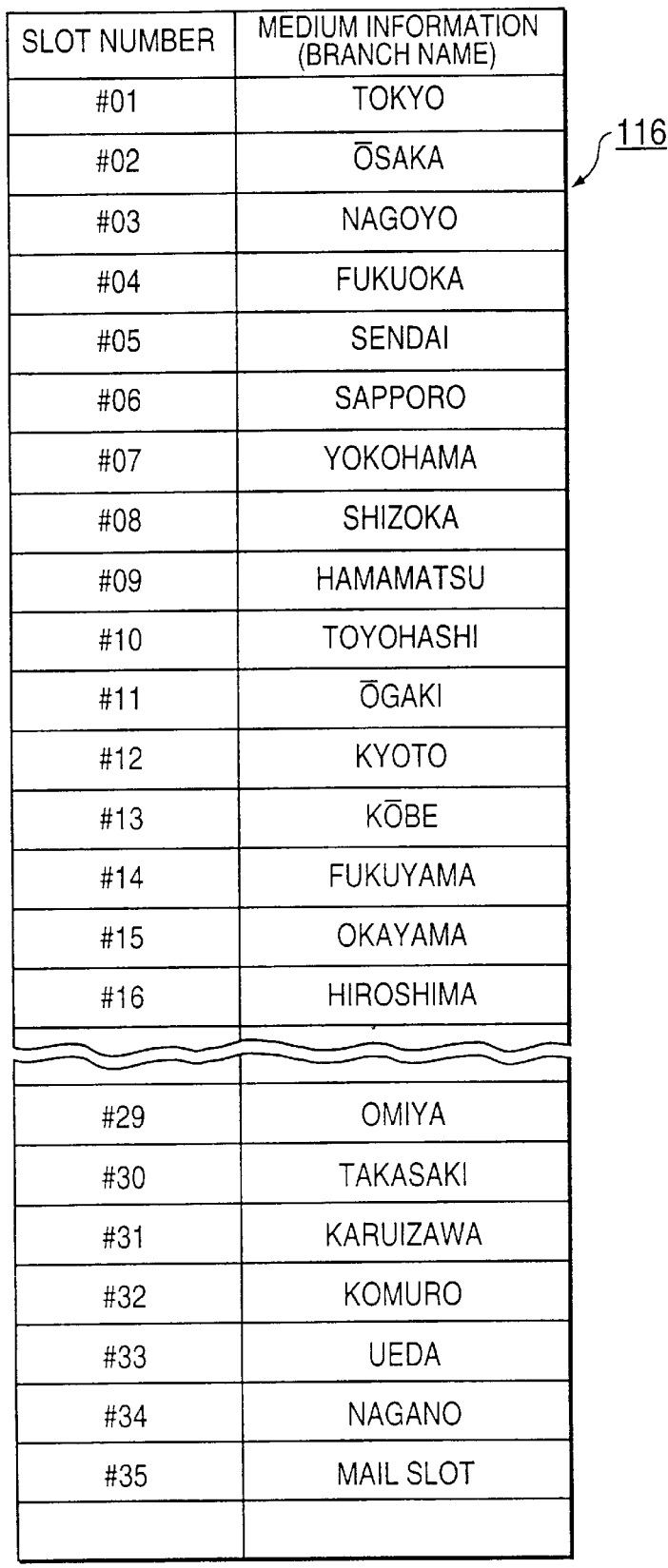
FIG. 14 shows a medium information management table of the host computer.

FIG. 14 shows a medium information management table 116 which is managed in the host computer 16 in FIG. 11. In the medium information management table 116 for the illustrative application of the library apparatus of the invention set forth above, branch names are registered as medium information in correspondence to the slots #01 to #35. The respective MO cartridge of each branch name is sent, for example, once a month from that branch to the main office at which the library apparatus is set up. The operator exchanges the MO cartridge of the current month for the MO cartridge of the preceding month, currently stored in the MO library apparatus.

To exchange the MO cartridges sent from the branches, one-by-one, the mail slot mode is set by the dip switch or the like the tray is opened (or closed) in accordance with the mail slot mode and the medium is inserted (or ejected). That is, when exchanging a new (current) medium for an old (preceding month) medium currently stored in the MO library apparatus for a given branch, the medium ejecting process is first executed with respect to the currently stored MO cartridge of the preceding month, for ejecting same; subsequently, the new medium of the current month for that same branch is inserted into the mail slot and thereupon is automatically conveyed to and inserted into the respective designated slot assigned to that branch.

Figure 15:
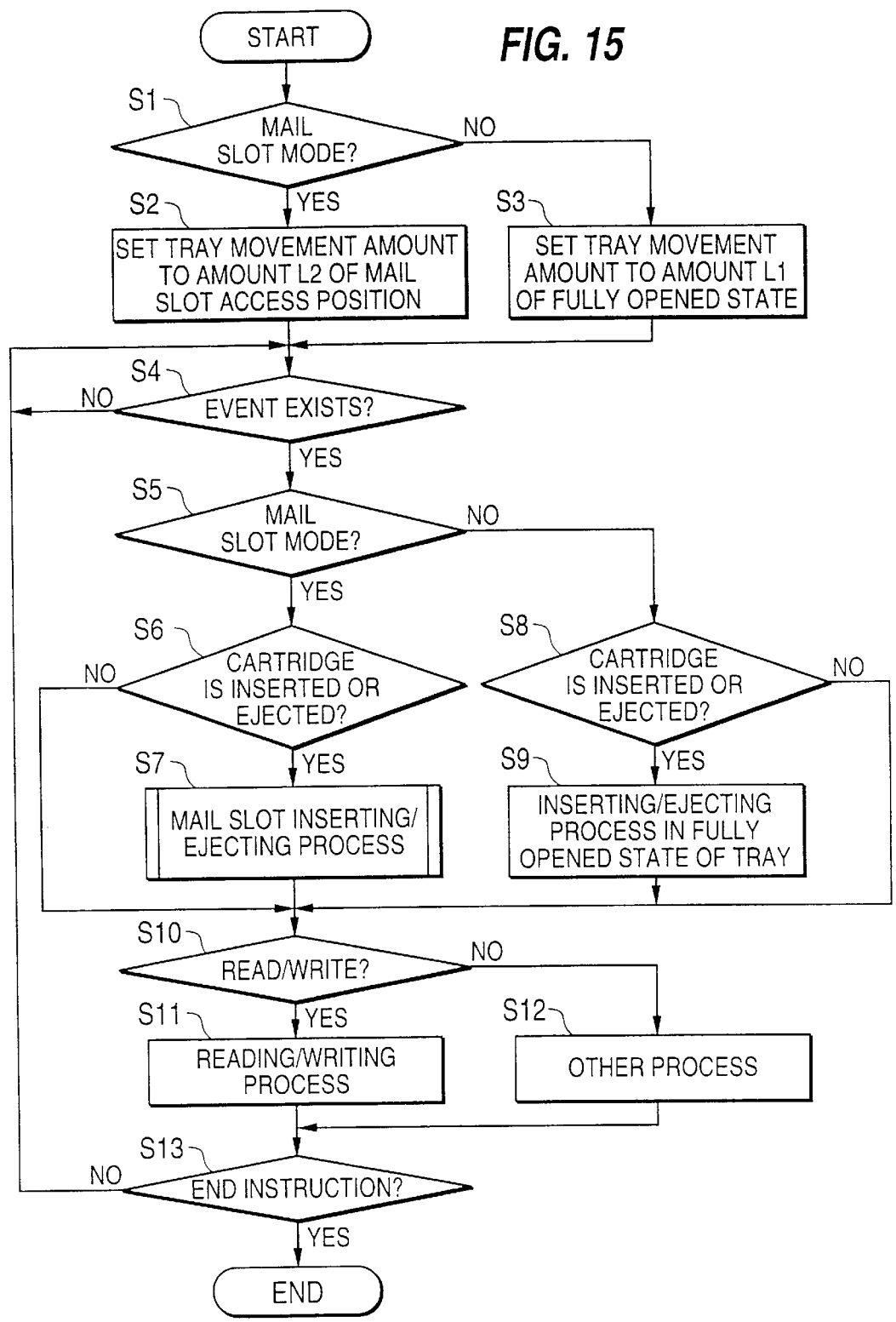
FIG. 15 is a flow chart of the overall control process of the library apparatus of the invention, as shown in FIG. 10.

FIG. 15 is a flow chart of the overall control process of the MO library apparatus of the invention shown in FIG. 10. First, when the apparatus is activated by turning on the power source, a status of the dip switch 112 is read in step S1, thereby checking whether the mail slot mode has been set. If YES, step S2 follows and the mode setting unit 100 sets the mail slot mode and the tray ejection amount is set to the tray movement amount L2 for the mail slot access position, in which an individual medium can be inserted or ejected as shown in FIG. 6.

On the other hand, in the normal mode, the tray movement amount L1 is set, in which the tray is fully opened as shown in FIG. 4. Subsequently, in step S4, an event is checked. When there is an event, a check is made in step S5 to see if the mail slot mode has been set. In the mail slot mode, a check is made in step S6 to see if the cartridge has been inserted/ejected or not. When the cartridge has been inserted/ejected, the inserting/ejecting process in the mail slot mode is executed in step S7.

In the normal mode, a check is made in step S8 to see if the cartridge has been inserted/ejected, or not. When the cartridge is inserted/ejected, the inserting/ejecting process of the cartridge, by fully opening the tray in the normal mode, is executed in step S9. Subsequently, a check is made, in step S10, to determine if the read or write access has been executed, or not. In the case of the read or write access, the reading/writing process has been executed in step S11.

When the reading/writing access is not to be performed, some other process may be executed in step S12. The reading/writing process is a process for conveying the cartridge held in the movement source slot to the MO drive by the moving command and for returning it to the original slot after completion of the reading/writing process. In final step S13, a check is made to determine if an end instruction, by a log off or the like, has been performed. The processes from step S4 then are repeated, until the end instruction is received.

Figure 16:
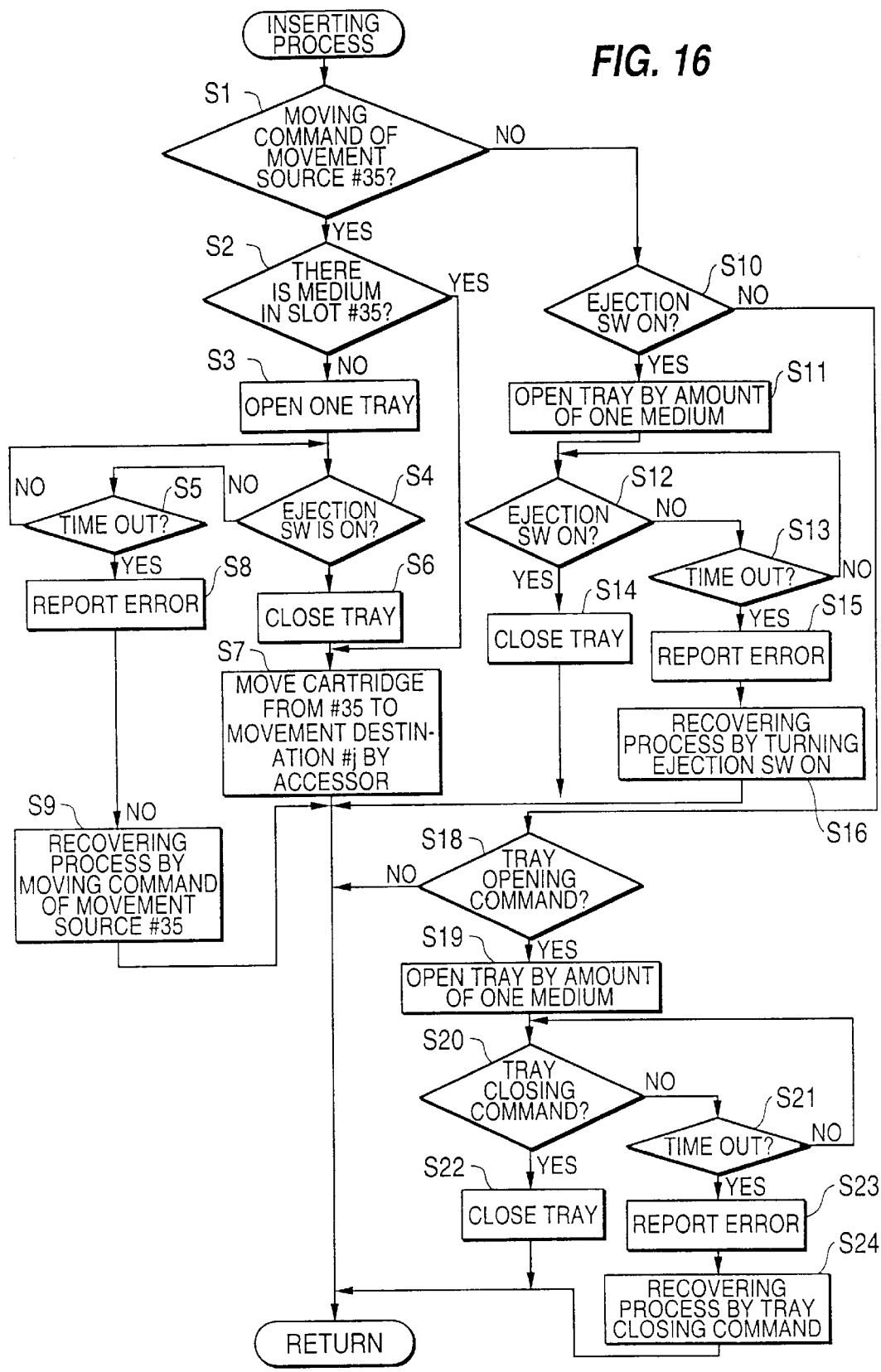
FIG. 16 is a flow chart of the medium insertion control functions of the apparatus of the invention.

FIG. 16 is a flow chart of the medium inserting process in the mail slot mode, as shown in step S7 in FIG. 15. The medium inserting process is divided into three sub-processes, comprising the sub-process by the moving command in which the movement source is set to the slot #35 of the mail slot 50 in steps S1 to S9, the inserting sub-process by only the ejection switch 24 in steps S10 to S16, and the inserting process by the tray opening command or tray closing command from the host computer 16 in steps S18 to S24.

First, the inserting process by the moving command from the host computer in which the movement source is set to the slot #35 of the mail slot 50 will be explained. In step S1, when the moving command, in which the movement source is set to the slot #35 of the mail slot 50, is discriminated, a check is made in step S2 to see if the medium is present in slot #35 serving as a mail slot 50.

When no medium is present, in step S3, the tray is opened to the mail slot access position as shown in FIG. 6, and thus by only a limited opening amount, at which one medium can be inserted into or withdrawn from the mail slot. Subsequently, in step S4, the ON operation of the ejection switch 24, which is executed after the medium is inserted into the mail slot, is checked. When there is no ON operation of the ejection switch 24 in step S4, the presence or absence of a time-out of the timer which was activated, or initiated, when the tray was opened, is discriminated in step S5.

When the ejection switch 24 is turned on before the time-out of the timer in step S5, the processing routine advances from step S4 to step S6 and the tray 20 is closed. In step S7, the accessor 28 takes the medium from the slot #35, serving as a (source) mail slot, on the basis of the moving command, moves the medium to the movement destination slot #j, designated by the moving command, and inserts it therein.

In the processes in steps S4 and S5, when a predetermined time has elapsed and the time-out is discriminated in step S5, before discriminating the ON operation of the ejection switch 24, step S8 follows and an error is reported to the host computer 16. In response to the error report, the host computer executes the recovering process by again generating the moving command in which the movement source is set to the slot #35 of the mail slot 50 in step S9. That is, by again generating the moving command in which the movement source is set to slot #35, the same process as that of the ON operation of the ejection switch 24 is executed. The tray 20 in the opening state is closed and is returned to the initial state.

The inserting process by using only the ejection switch 24 will now be described. When the ON operation of the ejection switch 24 is detected in step S10, step S1 follows and the tray 20 is opened as shown in FIG. 6 to the mail slot access position, i.e., the limited mail slot opening amount at which one medium can be taken out. In step S12, the ON operation of the ejection switch 24, which is executed after the medium has been inserted into the mail slot 50, is checked.

When the ejection switch 24 is detected as being turned on, the tray is closed in step S14. The movement of the medium by the accessor 28 from the (source) mail slot to the (insertion destination) slot assigned thereto, after which the tray was closed, is executed after waiting for receipt of a subsequent moving command, generated from the host computer 16. When the moving command is received, it is discriminated in step S1 that the movement source of the moving command is set to the slot #35 of the mail slot 50. Since the medium has already been inserted into the mail slot in step S2, step S7 follows and the cartridge is conveyed by the accessor 28 from the slot No. #35 of the mail slot to the (movement destination) assigned slot #j designated by the moving command.

On the other hand, while monitoring the ON operation of the ejection switch 24 in step S12, the time-out of the timer, which was activated when the tray was opened by the mail slot amount in step S11, is monitored. When the ejection switch 24 is not turned on even after the elapse of a predetermined time, the time-out occurs in step S13, step S15 follows, and an error is reported to the host computer.

Subsequently to this error report and in step S16, in this case, the tray 20, which is in the fully opened state resulting from the recovering process due to the turn-on of the ejection switch 24, is closed to the initial state. For the purpose of the recovering process by the ejection switch, it is sufficient that an alarm indicating that the tray is in the opened state is performed on the MO library apparatus side by a display indicator, a buzzer, or the like, by a command from the host computer which received the error report.

Further, as for the inserting process by the tray opening command and the tray closing command from the host computer, when the tray opening command from the host computer is discriminated in step S18, step S19 follows and the tray 20 is opened by the mail slot opening amount at which one medium can be inserted into the mail slot 50 as shown in FIG. 6.

Subsequently, in step S20, the apparatus waits for the tray closing command which is issued after the elapse of a predetermined time which is sufficient to insert the medium. A discriminating time of the tray closing command is monitored by the timer, which started counting when the tray was opened. When the tray closing command is received before the time-out in step S21, step S22 follows and the tray 20 is closed.

When the tray closing command is not received even after the elapse of a predetermined time, the time-out occurs in step S21 and an error is reported to the host computer 16 in step S23. In response to the error report, the recovering process to close the tray 20, currently in the opened state, is performed by issuing the tray closing command from the host computer in step S24.

In this instance, the recovering processes in steps S9, S16, and S24 have been described, separately, as follows:

1) recovering process by the moving command of the movement source #35;

2) recovering process by turning the ejection switch; and 3) recovering process by the tray closing command.

It is also possible to execute the recovering process for closing the tray 20 in the opened state and setting it to the initial state by any one of the three recovering processes.

Figure 17:
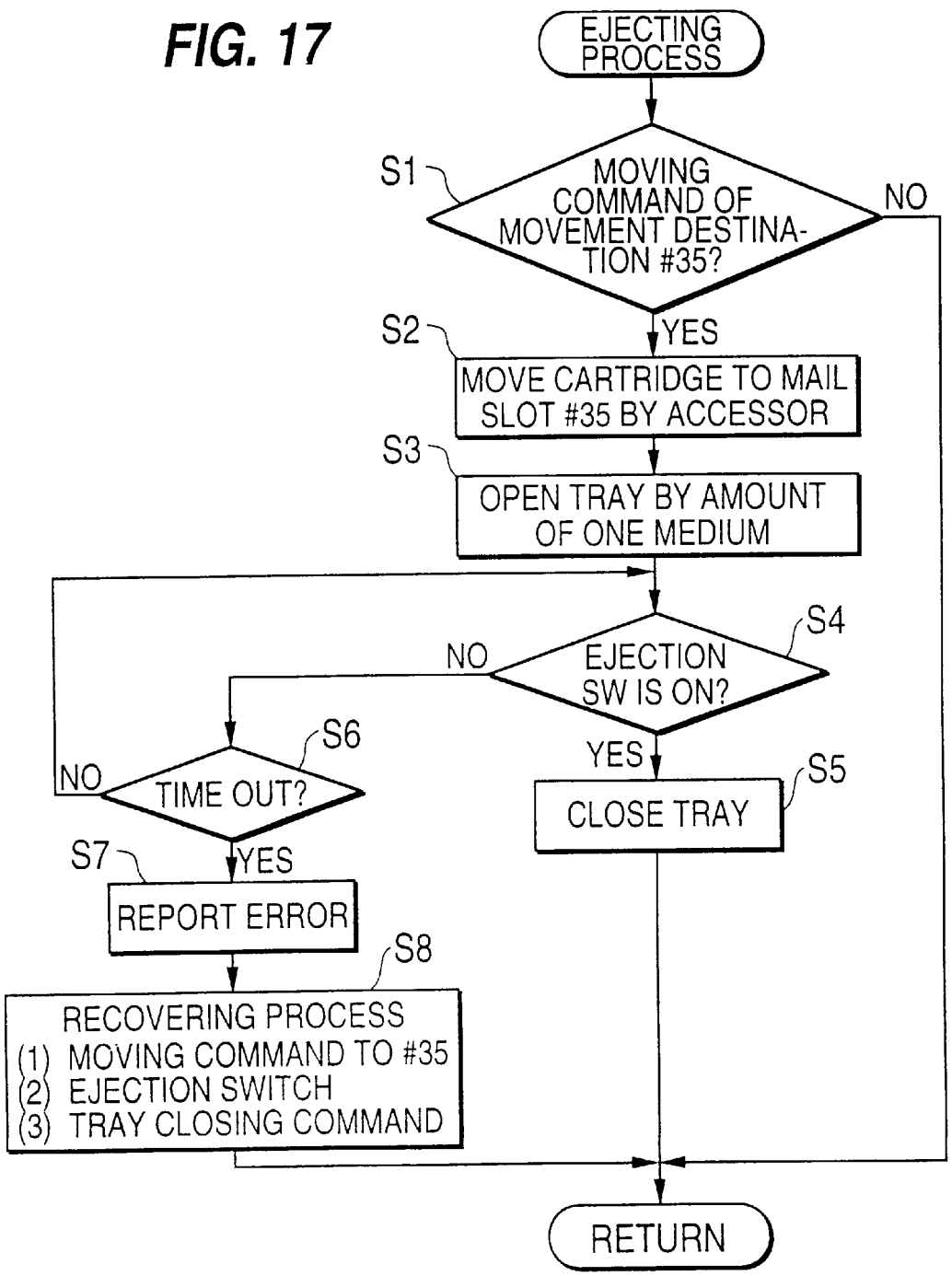
FIG. 17 is a flow chart of the medium ejection control functions of the apparatus according to the invention.

FIG. 17 is a flow chart for the medium ejecting process in the mail slot mode of the MO library apparatus of the invention. In the medium ejecting process, first in step S1, a check is made to see if the moving command has been received from the host computer in which the movement destination is set to the slot #35 of the mail slot 50. After receiving the moving command, step S2 follows and the cartridge is taken out from an arbitrary slot #i assigned to the cartridge to be ejected, designated as a movement source, and moved by the accessor 28 to the mail slot 50, designated as the destination slot #35. When the movement of the cartridge to the mail slot 50 finishes normally, in step S3 the tray 20 is opened to the mail slot access position and thus by the mail slot opening amount L2 at which the specified, individual medium can be taken out, as shown in FIG. 6. Subsequently in step S4, the ON operation of the ejection switch 24 is monitored so as to detect the operation of same by the operator after the medium is taken out from the mail slot 50 and, in response thereto, the tray is closed.

In this instance, the time-out of the timer, which was started when the tray was opened, is monitored in step S5. When the ON operation of the ejection switch 24 is detected in step S4 before the time-out, step S6 follows and the tray 20 is closed and is returned to the initial state. When the time-out occurs in step S5 before the ejection switch 24 is depressed, an error is reported to the host computer in step S8.

The recovering process for closing the tray 20 in the opened state and returning to the initial state is performed in response to the error report in step S9. The recovering process in this case is one of the following processes:

1) recovering by the moving command having the movement source slot #35;

2) recovering process by the operation of the ejection switch 24; or 3) recovering process by the tray closing command from the host computer 16.

Although the foregoing embodiment has been described with respect to the case where the front-most slot #35 in the tray 20 is allocated as the mail slot 50, this is merely an example and the position of the mail slot 50 can be properly defined otherwise, as may be necessary. Although one mail slot has been defined in the embodiment, it is also possible to construct the system in a manner such that a plurality of mail slots are defined, as may be necessary, thereby enabling a plurality of media to be simultaneously, or in a common step, manually inserted or ejected. The invention may also be applied to a library apparatus using magnetic tape cartridges other than the MO cartridges. Further, the invention is not limited by the numerical values shown in the above embodiment.

According to the invention and as explained above, in the library apparatus having a structure such that a plurality of slots, or positions, are provided in a tray which is movable in the first/depth direction of the apparatus main body and the media are inserted therein in a second/lateral direction, perpendicular to the first/depth direction, when the media are inserted or ejected into/from an arbitrary slot in the tray, at least one by one, the apparatus is set to the operating state by setting the mail slot mode. In the mail slot mode, the tray is opened by a limited amount so as to render a selected one, of one or more mail slots, accessible to an operator into which a medium can be manually inserted or withdrawn, consistent with insertion and ejection modes of operation.

Therefore, it is sufficient that the operator merely inserts or withdraws the medium into/from the mail slot of the tray, as opened by the limited opening amount to the mail slot access position, without being conscious of the destination/assigned slot position for that medium in the tray. The medium thus can be easily inserted (ejected) into (from) an arbitrary slot of the tray, on an individual, medium-by-medium basis, by the accessor automatically conveying the medium between the mail slot and a storage slot, in the closed state of the tray. A situation as can occur in the prior art, wherein a source or destination slot position is erroneously designated in conjunction with the insertion or ejection of a medium, is thereby avoided.

Numerous modifications and adaptations of the invention will be apparent to those skilled in the art and thus it is intended by the appended claims to cover all such modifications and adaptations as fall within the true spirit and scope of the invention.

I claim:

1. An apparatus, comprising:
   a tray movable in a first direction, selectively into a housing to a closed position and out of the housing, and having plural slots respectively and individually assignable to plural recording media, the plural recording media being selectively and individually insertable into and removable from the respectively assigned plural slots by movement thereof in a second direction transverse to the first direction, the tray being movable out of the housing, in a first mode, to a fully open position providing access to all slots and, in a second mode, to a limited open position affording insertion, or withdrawal, of an individual medium into, or from, a predesignated mail slot of the plural slots;
   an accessor transferring a selected, individual recording medium from a designated source location to a designated destination location; and
   a controller controlling the accessor, in an insertion operation of the second mode, for conveying a recording medium in the mail slot, when designated as a source location, to the respective, assigned slot of the tray, when designated as a destination location thereof, and, in an ejection operation of the second mode, for conveying a recording medium in the respective, assigned slot of the tray, when designated as a source location, to the mail slot, when designated as a destination location thereof.

2. A library apparatus, comprising:
   a housing;
   a tray having a plurality of individually assignable storage locations for respectively storing a plurality of replaceable, individually identified recording media, at least one storage location comprising a mail slot;
   a tray control unit operative to move the tray to a closed position within the housing affording access, within the housing, to the storage locations of the tray and any recording media stored therein and to a limited open position affording access, exteriorly of the housing, to the mail slot;
   an accessor; and
   a host computer issuing moving commands, each moving command identifying a recording medium and designating source and destination locations between which the identified recording medium is to be conveyed by the accessor, wherein:
   in an insertion operation, the host computer controls the tray control unit to move the tray to the limited open position thereof for inserting an identified recording medium into the mail slot and to move the tray with the identified recording medium inserted in the mail slot to the closed position thereof, and issues a moving command to the accessor designating the mail slot as the source of the identified recording medium and the respective, assigned storage location thereof in the tray as the destination thereof; and
   in an ejection operation, the host computer issues a moving command to the accessor identifying the respective, assigned storage location in the tray as the source of the identified recording medium and the mail slot as the destination thereof and controls the tray control unit, with the identified recording medium in the mail slot, to move the tray to the limited open position.

3. A library apparatus according to claim 2, further comprising:
   a display unit; and
   in the insertion operation, the host computer produces a display on the display unit indicating to a user the identified recording medium to be inserted by the user into the mail slot in the limited open position of the tray.

4. A library apparatus according to claim 2, further comprising:
   a switch operable by the user of the apparatus to indicate the insertion of the identified recording medium into the mail slot in the limited open position of the tray; and
   the host computer, in response to actuation of the switch by the user and in the limited open position of the tray, controlling the tray control unit to move the tray to the closed position of the tray within the housing.

5. A library apparatus according to claim 4, further comprising:
   a timing unit establishing a prescribed time interval after movement of the tray to the mail slot access position and, in the absence of actuation of the switch within the prescribed time interval, issuing an error signal; and
   the host computer, in response to the error signal, controlling the tray control unit to move the tray to the closed position thereof in the housing.

6. A library apparatus according to claim 2 wherein, in a recording media exchange operation:
   the host computer issues a moving command to the accessor to convey an identified recording medium, currently stored in the respective, assigned storage location thereof and to be ejected, to the mail slot and controls the tray control unit, with the identified recording medium currently stored in the mail slot, to move the tray to the limited open position for removal of the currently stored, identified recording medium therefrom to complete the ejection of same and for insertion of a new, commonly identified recording medium into the mail slot; and
   the host computer controls the tray control unit, with the new, commonly identified recording medium inserted in the mail slot, to move the tray to the closed position and issues a moving command to the accessor designating the mail slot as the source of the new, commonly identified recording medium and the respective, assigned storage location thereof in the tray as the destination thereof thereby to move the new, identified recording medium into the respective, assigned storage location thereof, in exchange for the ejected and commonly identified storage medium.

7. A library apparatus according to claim 6, further comprising:

a switch operable by a user of the apparatus; and the host computer, in response to actuation of the switch by the user and in the limited open position of the tray, controlling the tray control unit to move the tray to the closed position within the housing.

8. A library apparatus according to claim 7, further comprising:

a timing unit establishing a prescribed time interval after movement of the tray to the mail slot access position and, in the absence of actuation of the switch within the prescribed time, issuing an error signal; and the host computer, in response to the error signal, controlling the tray control unit to move the tray the closed position thereof in the housing.

9. A library apparatus according to claim 2, wherein the tray control unit is selectively operative in a first mode for moving the tray to the limited open position and in a second mode for moving the tray to a fully opened position in which all storage locations of the tray are accessible exteriorally of the housing, further comprising a mode setting unit for selectively setting one of the first and second modes of operation.

10. A library apparatus according to claim 9, wherein the tray control unit, in the first mode of operation and in response to a moving command from the host computer in which the mail slot is designated as a source, determines whether a recording medium is absent or present in the mail slot and, if absent, moves the tray to the limited open position for insertion of an identified recording medium into the mail slot; and in response to detecting the presence of a recording medium in the mail slot, produces a corresponding output to the host computer which responds thereto by producing an insertion operation.

11. A library apparatus according to claim 9, further comprising:

a switch operable by a user of the apparatus; and in the first mode, the tray control unit is responsive to actuation of the switch when the tray is in the closed position for moving the tray to the limited open position to receive an identified recording medium in the mail slot and is responsive to actuation of the switch when the tray is in the limited open position for moving the tray to the closed position.

12. A library apparatus according to claim 11, further comprising:

a sensor sensing a presence of a recording medium in the mail slot, in the closed position of the tray, and issuing a corresponding detection signal output;

the host computer, in response to the detection signal output, issuing a moving command to the accessor designating the mail slot as a source location and designating a further slot of the tray, respectively assigned to the identified recording medium in the mail slot, as a destination location; and the accessor responding to the moving command to convey the identified recording medium from the respective slot of the tray, assigned to the identified recording medium, and to the mail slot.

13. A library apparatus according to claim 12, further comprising:

a timing unit establishing a prescribed time interval after movement of the tray to the mail slot access position and, in the absence of actuation of the switch within the prescribed time, issuing an error signal; and the host computer, in response to the error signal, controlling the tray control unit to move the tray to the closed position thereof in the housing.

* * * * *

UNITED STATES PATENT AND TRADEMARK OFFICE
CERTIFICATE OF CORRECTION

PATENT NO.   : 6,034,928             Page 1 of 1
DATED        : March 7, 2000
INVENTOR(S)  : Kazuhiko Inoue It is certified that error appears in the above-identified patent and that said Letters Patent is hereby corrected as shown below:

<u>Column 22</u>:
Line 33, change "2"m to --3--.

Signed and Sealed this

Twelfth Day of June, 2001

*Attest:*

Nicholas P. Godici

*Attesting Officer*

NICHOLAS P. GODICI
*Acting Director of the United States Patent and Trademark Office*